US012647918B2

(12) United States Patent
Liu et al.

(10) Patent No.: US 12,647,918 B2
(45) Date of Patent: Jun. 2, 2026

(54) INFORMATION DETERMINING METHOD, INFORMATION SENDING METHOD, APPARATUS, AND DEVICE

(71) Applicant: VIVO MOBILE COMMUNICATION CO., LTD., Guangdong (CN)

(72) Inventors: Siqi Liu, Guangdong (CN); Zichao Ji, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 362 days.

(21) Appl. No.: 18/183,428

(22) Filed: Mar. 14, 2023

(65) Prior Publication Data

US 2023/0217393 A1    Jul. 6, 2023

Related U.S. Application Data

(63) Continuation of application No. PCT/CN2021/119854, filed on Sep. 23, 2021.

(30) Foreign Application Priority Data

Sep. 25, 2020    (CN) .......................... 202011027810.8

(51) Int. Cl.
*H04W 56/00* (2009.01)
*H04W 92/18* (2009.01)
(52) U.S. Cl.
CPC .......... *H04W 56/004* (2013.01); *H04W 92/18* (2013.01)
(58) Field of Classification Search
CPC ............. H04W 56/00; H04W 56/0005; H04W 56/0015; H04W 56/0045; H04W 56/004; H04W 92/18; H04W 72/40
See application file for complete search history.

(56) References Cited

U.S. PATENT DOCUMENTS

2011/0200032 A1    8/2011    Lindström et al.
2017/0019886 A1    1/2017    Patel et al.
(Continued)

FOREIGN PATENT DOCUMENTS

CN        102812760 A    12/2012
CN        106330499 A    1/2017
(Continued)

OTHER PUBLICATIONS

Huawei et. al, Change Request: Running CR to TS 38.331 for 5G V2X with NR sidelink, 3GPP TSG-RAN2 WG2 Meeting #108, R2-191XXX, Reno, Nevada, Nov. 18-22, 2019.
(Continued)

*Primary Examiner* — Congvan Tran

(74) *Attorney, Agent, or Firm* — Price Heneveld LLP

(57)        ABSTRACT

This application discloses an information determining method, an information sending method, an apparatus, and a device. The method includes: determining target information related to a target SL resource according to a target condition and/or a target reference object; where the target information indicates any one of the following: at least one of a first TAG or first timing information; at least one of that the target SL resource does not belong to any TAG or that the target SL resource does not have timing information; the first TAG and the target SL resource do not have timing information; and the first timing information and the target SL resource do not belong to any TAG.

20 Claims, 5 Drawing Sheets

(56) References Cited

U.S. PATENT DOCUMENTS

| | | | |
|---|---|---|---|
| 2017/0202043 A1 | 7/2017 | Seo | |
| 2017/0215160 A1 | 7/2017 | Löhr et al. | |
| 2017/0331577 A1 | 11/2017 | Parkvall et al. | |
| 2018/0160342 A1* | 6/2018 | Park | H04W 36/0033 |
| 2018/0352527 A1 | 12/2018 | Wang et al. | |
| 2019/0037622 A1 | 1/2019 | Blasco Serrano et al. | |
| 2019/0141697 A1 | 5/2019 | Islam et al. | |
| 2019/0174530 A1* | 6/2019 | Kim | H04W 72/0446 |
| 2020/0112400 A1 | 4/2020 | Lee et al. | |
| 2020/0178192 A1 | 6/2020 | Chae et al. | |
| 2020/0220669 A1 | 7/2020 | Park | |
| 2020/0229180 A1 | 7/2020 | Liu et al. | |
| 2020/0235871 A1 | 7/2020 | Kim et al. | |
| 2020/0275244 A1* | 8/2020 | Lee | G01S 5/0284 |
| 2020/0275398 A1 | 8/2020 | Da et al. | |
| 2020/0305174 A1* | 9/2020 | Ganesan | H04W 72/12 |
| 2021/0045079 A1 | 2/2021 | Jiang et al. | |
| 2021/0068120 A1 | 3/2021 | Jung et al. | |
| 2021/0227504 A1* | 7/2021 | Hosseini | H04W 72/23 |
| 2021/0235406 A1 | 7/2021 | Liu et al. | |
| 2022/0053440 A1 | 2/2022 | Kim et al. | |
| 2022/0141866 A1 | 5/2022 | Liu et al. | |
| 2022/0191733 A1* | 6/2022 | Ali | H04L 41/0806 |
| 2022/0225292 A1* | 7/2022 | Mohammad Soleymani | H04W 72/02 |
| 2022/0345261 A1* | 10/2022 | Ali | H04L 27/2636 |
| 2023/0138096 A1* | 5/2023 | Zhao | H04W 72/40 370/329 |
| 2023/0198708 A1* | 6/2023 | Hong | H04L 5/0094 370/329 |
| 2023/0254838 A1* | 8/2023 | Kim | H04L 5/00 370/329 |

FOREIGN PATENT DOCUMENTS

| | | | |
|---|---|---|---|
| CN | 106576314 A | 4/2017 | |
| CN | 106688297 A | 5/2017 | |
| CN | 108605213 A | 9/2018 | |
| CN | 108616840 A | 10/2018 | |
| CN | 109089309 A | 12/2018 | |
| CN | 109451845 A | 3/2019 | |
| CN | 110651509 A | 1/2020 | |
| CN | 110838898 A | 2/2020 | |
| CN | 111148229 A | 5/2020 | |
| CN | 111278050 A | 6/2020 | |
| CN | 111316720 A | 6/2020 | |
| CN | 111567105 A | 8/2020 | |
| CN | 111630933 A | 9/2020 | |
| WO | 2020067831 A1 | 4/2020 | |

OTHER PUBLICATIONS

Huawei et. al, Change Request: Introduction of 5G V2X with NR sidelink, 3GPP TSG-RAN2 WG2 Meeting #108, R2-2001966, Reno, Nevada, Nov. 18-22, 2019.

Ericsson, Uu-based sidelink resource allocation, 3GPP TSG-RAN WG1 Meeting #98bis, R1-1910533, Oct. 14-20, 2019, Chongqing, China.

Ericsson, Uu-based sidelink resource allocation, 3GPP TSG-RAN WG1 Meeting #99, R1-1912598, 18th-22nd 2019, Reno, NV, US.

Huawei, Hisilicon, Remaining details of sidelink synchronization mechanisms, 3GPP TSG RAN WG1 Meeting #101-e, R1-2003496, E-meeting, May 25-Jun. 5, 2020.

CATT, Feature lead summary #1 on AI 7.2.4.3 Sidelink synchronization mechanism, 3GPP TSG RAN WG1 Meeting #102-e, R1-2006948, e-Meeting, Aug. 17-28, 2020.

* cited by examiner

Network side device

11 — Terminal     11 — Terminal

Terminal

Timing advance group 1

| Uu slot 1 | Uu slot 2 |
|---|---|

| Uu slot 1 | Uu slot 2 |
|---|---|

Timing advance group 2

| Uu slot 1 | Uu slot 2 |
|---|---|

| Uu slot 1 | Uu slot 2 |
|---|---|

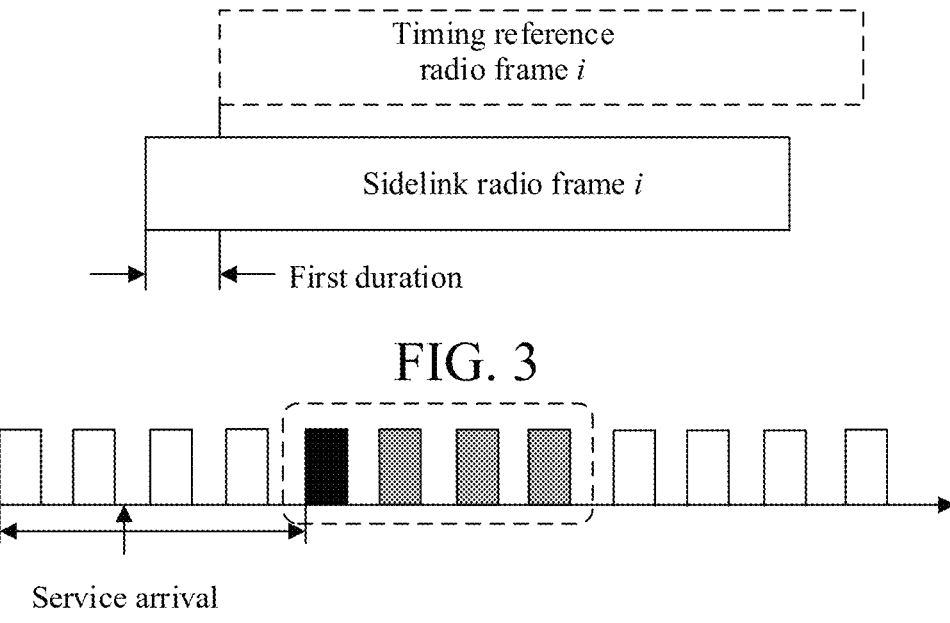
FIG. 3
FIG. 4
Determine, according to a target condition and/or a target reference object, target information related to a target sidelink SL resource          201
FIG. 5
Send a target timing advance command to a terminal          301
FIG. 6
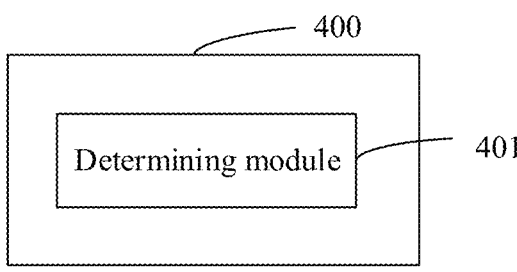
FIG. 7

INFORMATION DETERMINING METHOD, INFORMATION SENDING METHOD, APPARATUS, AND DEVICE

CROSS-REFERENCE TO RELATED APPLICATIONS

This application is a continuation application of International Application No. PCT/CN2021/119854 filed on Sep. 23, 2021, which claims priority to Chinese Patent Application No. 202011027810.8, entitled "INFORMATION DETERMINING METHOD, INFORMATION SENDING METHOD, APPARATUS, AND DEVICE", and filed with the China National Intellectual Property Administration on Sep. 25, 2020, which are incorporated herein by reference in their entireties.

TECHNICAL FIELD

This application pertains to the field of communications technologies, and specifically relates to an information determining method, an information sending method, an apparatus, and a device.

BACKGROUND

In a case of sidelink (SL) transmission, a terminal generally needs to determine a resource location of a required SL resource through timing.

However, timing of a cell in which control signaling indicating, configuring, scheduling, activating or deactivating an SL resource is located, for example, a cell in which SL downlink control information (DCI) is located, timing of a cell in which a scheduled SL resource is located, and timing of a cell in which a feedback resource used for an SL HARQ-ACK is located, for example, a cell in which a physical uplink control channel (PUCCH) resource or a physical uplink shared channel (PUSCH) resource is located, may be different, or may belong to different timing advance groups (TAG), that is, there are a plurality of TAGs, and generally, timing corresponding to different TAGs may be different. Therefore, currently, there is no effective solution that specifies how a terminal determines a required TAG from a plurality of TAGs.

SUMMARY

According to a first aspect, an information determining method is provided, where the method includes: determining, according to a target condition and/or a target reference object, target information related to a target sidelink SL resource; where the target information indicates any one of the following: at least one of a first timing advance group TAG or first timing information; at least one of that the target SL resource does not belong to any TAG or that the target SL resource does not have timing information; the first TAG and the target SL resource do not have timing information; and the first timing information and the target SL resource do not belong to any TAG.

According to a second aspect, an information determining apparatus is provided, and the apparatus includes a determining module, where the determining module is configured to determine, according to a target condition and/or a target reference object, target information related to a target sidelink SL resource; where the target information indicates any one of the following: at least one of a first timing advance group TAG or first timing information; at least one of that the target SL resource does not belong to any TAG or that the target SL resource does not have timing information; the first TAG and the target SL resource do not have timing information; and the first timing information and the target SL resource do not belong to any TAG.

According to a third aspect, an information sending method is provided, where the method includes: sending a target timing advance command to a terminal; where precision of the target timing advance command is related to any one of the following: an SL carrier spacing SCS, a UL SCS, and a first SCS in the SL SCS.

According to a fourth aspect, an information sending apparatus is provided, and the apparatus includes a sending module, where the sending module is configured to send a target timing advance command to a terminal; where precision of the target timing advance command is related to any one of the following: an SL carrier spacing SCS, a UL SCS, and a first SCS in the SL SCS.

According to a fifth aspect, a terminal is provided, where the terminal includes a processor, a memory, and a program or instructions that are stored in the memory and that may run on the processor, where the program or instructions are executed by the processor to implement the steps of the information determining method in the first aspect.

According to a sixth aspect, a communication device is provided, where the communication device includes a processor, a memory, and a program or instructions that are stored in the memory and that may run on the processor, where the program or instructions are executed by the processor to implement the steps of the method in the third aspect.

According to a seventh aspect, a readable storage medium is provided, where a program or instructions are stored on the readable storage medium, and the program or instructions are executed by a processor to implement the steps of the method in the first aspect, or implement the steps of the method in the third aspect.

According to an eighth aspect, a chip is provided, where the chip includes a processor and a communication interface, the communication interface is coupled to the processor, and the processor is configured to run a program or instructions of a network side device to implement the steps of the method in the first aspect, or implement the steps of the method in the third aspect.

BRIEF DESCRIPTION OF THE DRAWINGS

FIG. 3 is a schematic diagram of an SL timing relationship according to an embodiment of this application;

FIG. 4 is a schematic diagram of a configured uplink grant according to an embodiment of this application;

FIG. 5 is a schematic flowchart of an information determining method according to an embodiment of this application;

FIG. 6 is a schematic flowchart of an information sending method according to an embodiment of this application;

FIG. 7 is a first schematic structural diagram of an information determining apparatus according to an embodiment of this application;

DETAILED DESCRIPTION

The technical solutions in the embodiments of this application are clearly described in the following with reference to the accompanying drawings in the embodiments of this application. Apparently, the described embodiments are some rather than all of the embodiments of this application. All other embodiments obtained by a person of ordinary skill in the art based on the embodiments of this application shall fall within the protection scope of this application.

In the specification and claims of this application, terms "first" and "second" are used to distinguish similar objects, but are not used to describe a specific sequence or order. It is to be understood that data used in this way is interchangeable in a proper circumstance, so that the embodiments of this application may be implemented in an order other than the order illustrated or described herein. Objects distinguished by "first" and "second" are usually of the same type, and a quantity of the objects is not limited, for example, there may be one or more first objects. In addition, "and/or" in the specification and the claims represents at least one of connected objects, and a character "/" generally indicates an "or" relationship between associated objects.

It should be noted that technologies described in the embodiments of this application are not limited to a Long Term Evolution (LTE)/LTE-Advanced (LTE-A) system, and may be further applied to another wireless communications system such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-LTE-A), and another system. The terms "system" and "network" in the embodiments of this application are often used interchangeably. The described technology may be used in the foregoing system and radio technology, or may be used in another system and radio technology. The following description describes a New Radio (NR) system for example, and the NR term is used in most of the following descriptions. However, these technologies may also be applied to applications other than NR system applications, such as a 6th Generation (6G) communications system.

Figures 1, 2:
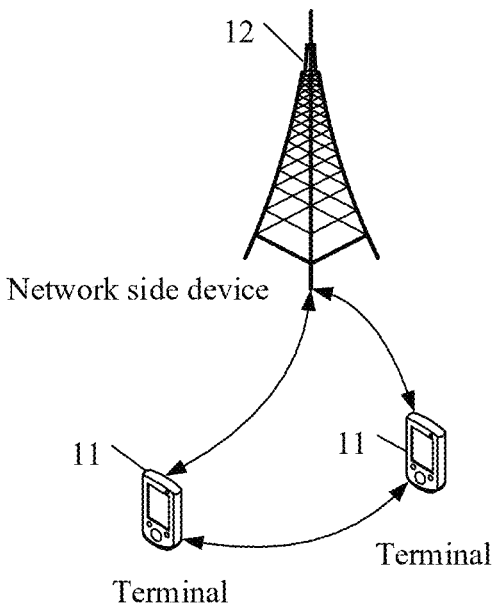
FIG. 1 is a system architecture diagram of a wireless communications system according to an embodiment of this application.
FIG. 2 is a schematic diagram of a timing advance group according to an embodiment of this application.

FIG. 1 is a block diagram of a wireless communications system applicable to an embodiment of this application. The wireless communications system includes a terminal 11 and a network side device 12. The terminal 11 may also be referred to as a terminal device or user equipment (UE). The terminal 11 may be a terminal device such as a mobile phone, a tablet computer (Tablet Personal Computer), a laptop computer, a personal digital assistant (PDA), a palm-top computer, a netbook, a ultra-mobile personal computer (UMPC), a mobile Internet device (MID), a wearable device, or vehicle user equipment (VUE), or pedestrian user equipment (PUE). The wearable device includes: a band, a headset, glasses, and the like. It should be noted that a specific type of the terminal 11 is not limited in this embodiment of this application. The network side device 12 may be a base station or a core network. The base station may be referred to as a Node B, an evolved Node B (eNB), an access point, a base transceiver station (BTS), a radio base station, a radio transceiver, a basic service set (BSS), an extended service set (ESS), a home Node B, a home evolved Node B, a WLAN access point, a Wi-Fi node, a transmission reception point (TRP), or another suitable term in the field. Provided that a same technical effect is achieved, the base station is not limited to a specific technical term. It needs to be noted that, in this application, only a base station in a NR system is used as an example, but a specific type of the base station is not limited.

The following describes the technical terms involved in the embodiments of this application.

1. Timing Advance Group (TAG)

In Uu carrier aggregation (CA), there may be a plurality of TAGs, timing is different between different TAGs, timing of carriers or cells in a same TAG is the same, and a same timing advance (TA) command is used to adjust a TA. FIG. 2 is a schematic diagram of different TAGs.

2. SL

A terminal may communicate with another terminal on a sidelink. These terminals may generally be vehicles supporting a sidelink technology, road side units (road site unit, RSU), mobile phones, or the like.

A resource allocation mode of a terminal that supports a vehicle to everything (V2X) technology may be divided into two types, usually referred to as a mode 1 and a mode 2.

Mode 1: The base station may schedule or control transmission of the terminal on the sidelink by using a Uu interface, and allocate a corresponding resource to the terminal.

Mode 2. The terminal obtains, by itself, a resource of transmission of the terminal on the sidelink, and some terminals may further schedule transmission, on the sidelink, of another terminal that supports the V2X technology.

It should be noted that the foregoing mode 1 and mode 2 may also be represented by other names, which is not limited in the embodiments of this application.

3. NR SL Timing

In a case that the terminal performs sidelink transmission (for example, sending or receiving), transmission is performed based on timing of a selected synchronization reference source. The synchronization reference source may also be referred to as a synchronization reference or a timing reference. The synchronization reference source of the terminal may be timing provided by a base station or a global navigation satellite system (GNSS), timing generated by a local clock of the terminal, or timing provided by another device. A sidelink resource may be numbered based on timing of the sidelink. In this case, a frame number of the sidelink is referred to as a direct frame number (DFN), and a sidelink channel includes a physical sidelink broadcast channel (PSBCH), a physical sidelink control channel (PSCCH), a physical sidelink shared channel (PSSCH), a physical sidelink feedback channel (PSFCH), and the like.

4. LTE SL Timing

In LTE V2X, a time at which a terminal transmits a sidelink radio frame number i is earlier than a timing reference frame of the terminal by first duration, and the first duration is $(N_{TA,SL}+N_{TAoffset}) \cdot T_S$ seconds. If cells corresponding to the terminal have a cell that meets an S criterion, in this case, timing of a reference radio frame i is equal to timing of the cell and a downlink radio frame i corresponding to a UL carrier used for SL transmission. In this case, for a frame structure type 1, $N_{TAoffset}=0$; and for a frame structure type 2, $N_{TAoffset}=624$ If the cells corresponding to the terminal do not have a cell that meets the S criterion, $N_{TA\ offset}=0$.

For the PSSCH in the foregoing mode 1, $N_{TA,SL}=N_{TA}$, and $N_{TA}$ is a timing advance between uplink timing and downlink timing; in other cases, $N_{TA,SL}$. As shown in FIG. 3, this application shows a schematic diagram of an SL timing relationship.

5. Configured Uplink (UL) Grant and Configured Sidelink Grant

For a requirement of a low-latency service or a periodic service, a configured UL grant in NR supports two uplink transmission manners of an uplink semi persistent scheduling grant: type1 and type2. A configured UL grant type1 resource may be semi-persistently configured by using RRC signaling. After receiving the configuration, the terminal may perform transmission according to a service arrival status and a configuration status of the terminal, without requiring downlink control information (DCI) to perform dynamic scheduling. A configured UL grant type2 resource may be semi-persistently configured by using RRC signaling. After receiving the configuration, the terminal cannot directly use the configuration. After the base station further activates the configuration by using DCI, the terminal can use the grant resource according to the activated DCI. It should be noted that the base station may further deactivate the configuration by using DCI, and a terminal that receives the DCI stops using the grant resource. FIG. 4 illustrates an example of the configured UL grant type1, where one period includes four transmission occasions.

One configured UL grant generally corresponds to a periodic resource that can be used by UE to send a signal, and each period includes a plurality of transmission occasions. Compared with conventional dynamic grant scheduling, the configured UL grant can reduce signaling overheads and interaction procedures, thereby ensuring a low delay requirement.

The concept of configured UL grant-like configured sidelink grant is introduced in the sidelink. The configured sidelink grant usually supports two modes:

A control node configures a sidelink resource, and does not need to send additional signaling to activate and/or deactivate the configuration. The configured terminal may use these resources according to an incoming packet status. The resource configuration may be referred to as a configured sidelink grant type 1, or an SL CG type 1 for short.

The control node configures the sidelink resource by using signaling, and needs to send additional signaling to activate or deactivate the configuration for the resource. The resource configuration may be referred to as a configured sidelink grant type 2, or an SL CG type 2 for short.

It should be noted that a plurality of configured sidelink grants may be configured on the base station.

One configured SL grant generally corresponds to a periodic resource that can be used for UE transmission, and each period includes one or more transmission occasions. Compared with conventional dynamic grant scheduling, the foregoing two manners can reduce signaling overheads and interaction procedures, thereby ensuring a low delay requirement.

For the SL CG type 1, the base station configures a period and an SL resource location in a period by using an RRC configuration, and the terminal considers that the SL resource periodically appears at a corresponding location, so that SL resources in one or more periods can be determined according to the configuration of the SL CG type 1.

6. Resources Scheduled by SL DCI

The SL DCI further indicates an interval $K_{SL}$ between the DCI and the first SL transmission scheduled by the DCI, and the first SL transmission is not earlier than the first sidelink slot at a moment $$T_{DL} - \frac{T_{TA}}{2} + K_{SL} \times T_{slot}$$

in a resource pool. $T_{DL}$ is a start point of a downlink slot in which the DCI is received, $$\frac{T_{TA}}{2}$$

is a timing advance value, and $T_{slot}$ is SL slot duration.

7. SL HARQ Feedback

To improve reliability and resource utilization of data transmission on the sidelink, a hybrid automatic repeat request (HARQ) feedback (that is, sidelink HARQ-ACK) mechanism is supported in the sidelink technology. After receiving sidelink data (sidelink data is transmitted on the PSSCH, where the PSSCH is scheduled by using the SCI, and the SCI is transmitted on the PSCCH and or the PSSCH), a sideline receiving terminal may indicate, by feeding back sidelink HARQ-ACK information, whether transmission of the sidelink succeeds or fails, and the sidelink HARQ-ACK is transmitted on a PSFCH resource. After receiving the sidelink HARQ-ACK information on the sidelink, the sidelink sending terminal can learn whether the previous transmission succeeds or fails. It should be noted that a sidelink terminal may separately receive sidelink data or send sidelink data at different time or frequency domain.

Transmission of a sidelink data packet may be performed between the control node and the terminal (in this case, the control node works on the sidelink), or may be performed between terminals. In the latter case, the control node may not directly know whether transmission of the sidelink data packet succeeds. The terminal needs to send sidelink HARQ-ACK information (for example, a sidelink ACK/NACK) to the control node by using the PUCCH or the PUSCH, so that the control node can further determine whether transmission on the sidelink succeeds.

A terminal that sends sidelink HARQ-ACK information corresponding to sidelink transmission to the base station is a sending terminal that sends the sidelink transmission.

When the control node is a base station, the base station needs to allocate a PUCCH or PUSCH resource that is used to report sidelink HARQ-ACK information. Allocation of the PUCCH or PUSCH resource is implemented by using a PSFCH-PUCCH offset that is in RRC or DCI and that indicates a slot interval between the PSFCH and the PUCCH.

Specifically, a method for determining, by using the PSFCH-PUCCH offset, the PUCCH used to report the SL HARQ-ACK information is:

Assuming that SL timing is aligned with a frame boundary of downlink (DL) timing, the terminal may derive a virtual last PSFCH location based on DL timing of Uu, and then a corresponding location obtained after shifting by the PSFCH-PUCCH offset based on the virtual last PSFCH location is the location of the PUCCH.

As shown below, DL timing and SL timing of Uu of the base station are not aligned, and DCI indicates $K_{SL}=1$ and indicates PSFCH-PUCCH offset=2 slot. In this case, the terminal performs SL transmission on the first sidelink slot that is not earlier than a moment $$T_{DL} - \frac{T_{TA}}{2} + K_{SL} \times T_{slot}$$

in the resource pool, then may determine a PSFCH resource location associated with the transmission, and then determines, based on downlink timing, a virtual PSFCH slot that is aligned with a boundary of the PSFCH slot, and a location obtained after the location offset PSFCH-PUCCH offset=2 slot is the location of the PUCCH.

An information determining method provided in the embodiments of this application are described in detail below with reference to the accompanying drawings by using specific embodiments and application scenarios.

An embodiment of this application provides an information sending method. The information sending method may be applied to a terminal, that is, the information sending method may be performed by software or hardware installed in the terminal.

Based on this, as shown in FIG. 5, the information determining method may include the following step 201:

Step 201: Determine, according to a target condition and/or a target reference object, target information related to a target sidelink SL resource.

The target information indicates any one of the following: at least one of a first timing advance group TAG or first timing information; at least one of that the target SL resource does not belong to any TAG or that the target SL resource does not have timing information; the first TAG and the target SL resource do not have timing information; and the first timing information and the target SL resource do not belong to any TAG.

In this embodiment of this application, the target information may be configured by a network side device for the terminal, or may be determined by the terminal according to a status of the terminal, or may be specified in a protocol, which is not limited in this embodiment of this application.

Optionally, in this embodiment of this application, the first timing information includes at least one of the following: a first timing advance value or downlink reference timing. For example, the first timing advance value may include at least one of the following: a first sub-timing advance value (for example, $N_{TA}$, a timing advance between uplink timing and downlink timing) or a second sub-timing advance value (for example, $T_{TA}$, a timing advance between uplink timing and downlink timing). For example, there may be one offset between the first sub-timing advance and the second sub-timing advance.

It should be noted that the downlink reference timing in this application may be used to determine a location of a feedback resource associated with an SL transmission resource.

In this embodiment of this application, the target condition includes at least one of the following: the target SL resource meets a first condition, or a synchronization reference of the terminal is not a base station or another terminal covered by the base station. The first condition includes at least least one of the following: located in a non-shared resource, located in an intelligent transport system (ITS) band, located in an SL dedicated resource, located in a resource with only a PC5 interface, or located in a resource that does not coexist with another technology.

It should be noted that located in anon-shared resource may be understood as not located in a shared resource. The another technology may include at least one of the following: a Uu technology, a Wi-Fi technology, or a spectrum sharing technology.

It should be noted that the resource in this application may include at least one of the following: a time domain resource or a frequency domain resource.

In this embodiment of this application, the target reference object may include one reference object, or may include a plurality of reference objects. This is not limited in this embodiment of this application.

In this embodiment of this application, the target reference object is at least one of the following: a cell or a carrier corresponding to a synchronization reference, a preset cell or carrier, a cell or a carrier for transmitting first control signaling, a cell or a carrier in which a resource used to transmit SL feedback information is located, or a cell or a carrier in which the target SL resource is located.

In a first case, the target reference object is a cell or a carrier corresponding to a synchronization reference.

It should be noted that the cell or carrier corresponding to the synchronization reference is any one of the following: The terminal obtains a cell or a carrier of the synchronization reference, the terminal obtains a cell or a carrier of a synchronization reference source, and the terminal obtains a cell or a carrier of synchronization timing. For example, the synchronization reference of the terminal is a GNSS. If the terminal obtains (or finds) a reliable GNSS on a carrier 1, a carrier corresponding to the synchronization reference is the carrier 1.

In a second case, the target reference object is a preset cell or a preset carrier.

Example 1: The preset cell may be a cell with a largest cell identifier or a cell with a smallest cell identifier. The preset carrier may be a carrier with a largest carrier identifier or a carrier with a smallest carrier identifier.

Example 2: The preset cell or the preset carrier may be a cell or a carrier corresponding to a preset identifier. For example, the preset cell or the preset carrier may be a cell or a carrier whose preset identifier is 0, or the preset cell or the preset carrier may be a cell or a carrier whose preset identifier is 1010.

Example 3: The preset cell or the preset carrier may be a cell or a carrier that is located in a non-shared resource, or is located in an ITS band, or is located in an SL dedicated resource, or is located in a resource with only a PC5 interface, or is located in a resource that does not coexist with another technology.

Optionally, in this embodiment of this application, the method may further include the following step: In a case that the target SL resource meets the first condition, determining that the target reference object is a preset reference object.

The preset reference object includes a preset cell or a preset carrier; the target information is information corresponding to the preset reference object; and the first condition includes at least one of the following: located in a non-shared resource, located in an ITS band, located in an SL dedicated resource, located in a resource with only a PC5 interface, or located in a resource that does not coexist with another technology.

In a third case, the target reference object is a cell or a carrier for transmitting first control signaling.

For example, the first control signaling in this application includes at least one of the following: an SL semi persistent scheduling (SPS) configuration, an SL CG configuration, or SL DCI.

It should be noted that the SL DCI in this application is DCI for scheduling, activating, or deactivating an SL resource. For example, the SL DCI may be a DCI format 3-0, or a DCI format 3-1, or a DCI format 5A, or an SL-CS-RNTI, or DCI scrambled by an SL-RNTI. The SL CG configuration in this application includes at least one of the following: an SL CG type 1 configuration or an SL CG type 2 configuration.

For example, in a case that the target information includes the first TAG, the first TAG may be any one of the following: A TAG corresponding to a cell or a carrier for transmitting SL DCI, and a TAG corresponding to a cell or a carrier for transmitting an SL CG configuration (for example, the SL CG type1 configuration).

For example, in a case that the target information includes the first timing information, the first timing information may be any one of the following: timing information corresponding to a cell or a carrier for transmitting SL DCI, and timing information corresponding to a cell or a carrier for transmitting an SL CG configuration (for example, the SL CG type 1 configuration). For example, the second sub-timing advance value is corresponding to the cell or the carrier for transmitting SL DCI, or is corresponding to the cell or the carrier for transmitting the SL CG type 1 configuration.

In a fourth case, the target reference object is the cell or the carrier in which the resource used to transmit the SL feedback information is located.

For example, the resource for transmitting the SL feedback information may be an uplink resource for transmitting the SL feedback information. For example, the SL feedback information may be an SL HARQ-ACK, and an uplink resource for transmitting the SL feedback information may be a PUCCH or a PUSCH.

In a fifth case, the target reference object is the cell or the carrier in which the target SL resource is located.

It should be noted that the cell or the carrier in which the target SL resource is located in this application may be understood as a scheduled cell or carrier in which the target SL resource is located, or a scheduled SL cell or SL carrier.

For example, in a case that the target information includes a first TAG, the first TAG may be any one of the following: a TAG corresponding to a cell or a carrier in which the target SL resource scheduled or activated or deactivated by SL DCI is located, a TAG corresponding to a cell or a carrier in which the target SL resource configured by an SL CG configuration (for example, the SL CG type1 configuration) is located, and a TAG corresponding to a cell or a carrier in which the target SL resource configured by an SL semi persistent scheduling SPS configuration is located.

For example, in a case that the target information includes first timing information, the first timing information is any one of the following: timing information corresponding to a cell or a carrier in which the target SL resource scheduled or activated or deactivated by SL DCI is located, timing information corresponding to a cell or a carrier in which the target SL resource configured by an SL CG configuration (for example, the SL CG type 1 configuration) is located, and timing information corresponding to a cell or a carrier in which the target SL resource configured by an SL semi persistent scheduling SPS configuration is located.

It should be noted that transmission in this application may be understood as sending or receiving. For example, the foregoing cell or carrier for transmitting the first control signaling may be a cell or carrier for sending the first control signaling by the base station, or a cell or carrier for receiving the first control signaling by the terminal.

In this embodiment of this application, the target SL resource may include one SL resource, or may include a plurality of SL resources. This is not limited in this embodiment of this application. In this embodiment of this application, the target SL resource may be at least one of an LTE SL resource or an NR SL resource. In this embodiment of this application, the target SL resource may be an actual or candidate SL resource, which is not limited in this embodiment of this application. In this embodiment of this application, the target SL resource may be indicated or configured by using the first control signaling.

Optionally, in this embodiment of this application, the target SL resource includes at least one of the following: a first SL transmission resource indicated, configured, scheduled, activated, or deactivated by the first control signaling, or a first feedback resource corresponding to the first control signaling. The first control signaling includes at least one of the following: an SL SPS configuration, an SL CG configuration, or SL DCI.

It should be noted that the first SL transmission resource may be any one of the following: all transmission resources indicated or scheduled or activated or deactivated by the first control signaling, or some transmission resources indicated or scheduled or activated or deactivated by the first control signaling. The first feedback resource may be any one of the following: feedback resources corresponding to all SL transmission resources indicated or scheduled or activated or deactivated by the first control signaling, or feedback resources corresponding to some SL transmission resources indicated or scheduled or activated or deactivated by the first control signaling. For example, the first feedback resource may be the last PSFCH resource associated with a PSSCH resource indicated by the first control signaling.

In an example, the foregoing determining the timing information related to the target sidelink SL resource may be understood as determining timing information related to the cell or the carrier in which the target SL resource is located.

Optionally, in this embodiment of this application, the target reference object is at least one of the following: a cell or a carrier corresponding to a synchronization reference, a preset cell or carrier, a cell or a carrier for transmitting first control signaling, a cell or a carrier in which a resource used to transmit SL feedback information is located, or a cell or a carrier in which the target SL resource is located. The target information indicates the first TAG and/or the first timing information. Optionally, in this embodiment of this application, the target SL resource may meet any one of the following: The target SL resource belongs to a specific TAG or does not belong to a specific any TAG, and the first timing advance value corresponding to the target SL resource is 0 or the first timing advance value does not exist.

In an example, in a case that the target condition includes that the target SL resource meets a first condition, the target information indicates that the target SL resource belongs to a predetermined TAG or does not belong to any TAG, and the first TAG is the predetermined TAG.

The first condition includes at least one of the following: located in a non-shared resource, located in an ITS band, located in an SL dedicated resource, located in a resource with only a PC5 interface, or located in a resource that does not coexist with another technology.

In another example, the target condition includes at least one of the following: the target SL resource meets a first condition, or a synchronization reference of the terminal is not a base station or another terminal covered by the base station; and then the target information indicates that the first timing advance value does not exist; or the target information is the first timing advance value, and the first timing advance value is 0.

The first condition includes at least one of the following: located in a non-shared resource, located in an ITS band, located in an SL dedicated resource, located in a resource with only a PC5 interface, or located in a resource that does not coexist with another technology.

Optionally, in this embodiment of this application, in a case that the target information indicates the first TAG and/or the first timing information, the target information is information corresponding to the target reference object.

The information corresponding to the target reference object may include at least one of the following: a TAG corresponding to the target reference object or timing information corresponding to the target reference object.

In a first example, in a case that the target information indicates the first TAG, the target information may be the TAG corresponding to the target reference object.

Example 1: If the target reference object is the cell or the carrier for transmitting the SL DCI, the TAG corresponding to the target SL resource may be a TAG corresponding to the cell or the carrier for transmitting the SL DCI. For example, a carrier 1 schedules an SL resource on a carrier 2. If the carrier 1 belongs to TAG1, a TAG corresponding to the SL resource is TAG1.

Example 2: If the target reference object is the cell or the carrier in which the uplink resource used to transmit the SL HARQ-ACK is located, the TAG corresponding to the target SL resource may be a TAG corresponding to the cell or the carrier in which the uplink resource used to transmit the SL HARQ-ACK is located.

Example 3: If the target reference object is the cell or the carrier in which the target SL resource is located, the TAG corresponding to the target SL resource may be a TAG corresponding to the cell or the carrier in which the target SL resource is located. For example, a carrier 1 schedules an SL resource on a carrier 2. If the carrier 2 belongs to TAG2, a TAG corresponding to the SL resource is TAG2.

In a second example, in a case that the target information is the first timing information, the target information may be the timing information corresponding to the target reference object.

For example, the timing information corresponding to the target reference object may be a timing advance value corresponding to the target reference object, or may be downlink reference timing corresponding to the target reference object.

In a third example, in a case that the target information indicates the first TAG and the first timing information, the target information may be the TAG and the timing information corresponding to the target reference object.

For example, in a case that the target reference object includes a plurality of reference objects, the terminal may determine the first TAG and the first timing information according to a same reference object, or may separately determine the first TAG and the first timing information according to different reference objects. This is not limited in this embodiment of this application. For example, the target reference object is a reference object 1 and a reference object 2. The terminal may determine the first TAG according to a TAG of the reference object 1, and determine the first timing information according to the reference object 2.

Further, optionally, in this embodiment of this application, the first timing information may be determined based on the first TAG.

In an example, the first timing information may be determined based on the timing information corresponding to the first TAG. For example, the first timing information is the timing information corresponding to the first TAG.

Optionally, in this embodiment of this application, after the terminal determines the target information related to the target SL resource, the terminal may apply the target information to SL transmission.

For example, after step 201, the method may further include the following step 202:

Step 202: Determine a resource location of the target SL resource according to the target information.

In an example, the terminal may determine the resource location of the target SL resource according to all or a part of the target information.

Optionally, in this embodiment of this application, the resource location of the target SL resource may be determined according to a first location obtained after a target offset is performed based on the target location.

The target location is determined according to first control signaling, the target offset is determined according to the target information, and the first control signaling includes at least one of the following: an SL SPS configuration, an SL CG configuration, or SL DCI. In a possible implementation, the target offset may be a result of multiplying the first sub-timing advance by a coefficient a (e.g., 0.5), or a result of multiplying the second sub-timing advance by a coefficient b (e.g., 0.5).

Optionally, in this embodiment of this application, in a case that the target SL resource is an LTE SL resource, the target SL resource is located on a resource that is not earlier than the first location.

For example, in a case that the target SL resource is an LTE SL resource, the target SL resource is located on a resource that is not earlier than a moment $$T_{DL} - \frac{N_{TA}}{2} \times T_S + (4+m) \times 10^{-3}$$

In an implementation method, $N_{TA}$ is $N_{TA}$ corresponding to the cell or the carrier in which the SL DCI is located. In another implementation, $N_{TA}$ is $N_{TA}$ corresponding to the cell or the carrier in which the target SL resource is located.

Optionally, in this embodiment of this application, in a case that the target SL resource includes a second SL transmission resource indicated by the SL DCI, the second SL transmission resource is located on a preset resource that is not earlier than the first location.

Further, in a case that the target SL resource includes the second SL transmission resource indicated by the SL DCI, the second SL transmission resource is located on a preset resource that is in a resource pool and that is not earlier than the first location.

The first location is determined based on the target information.

For example, if the second SL transmission resource is the first SL transmission resource in the SL transmission resource indicated by the SL DCI, the second SL transmission resource is located in the first SL slot that is not earlier than a moment $$T_{DL} - \frac{T_{TA}}{2} + K_{SL} \times T_{slot}$$

in the resource pool.

Optionally, in this embodiment of this application, in a case that the target SL resource includes a third SL transmission resource in the SL CG configuration, the third SL transmission resource is located at the first location.

The target location is determined based on the downlink timing and SL CG configuration.

For example, the third SL transmission resource is located at a location advanced by $$\frac{T_{TA}}{2}$$

of the target location determined based on the downlink timing and SL CG configuration.

Optionally, in this embodiment of this application, in a case that the target SL resource includes a second feedback resource associated with a fourth SL transmission resource, the second feedback resource is located at a first location determined in a case that downlink reference timing and SL timing are aligned.

For example, the downlink reference timing and the SL timing may be all aligned, or may be partially aligned, which is not limited in this embodiment of this application.

For example, assuming that the downlink timing is aligned with a frame boundary of the SL timing, the second feedback resource is located at a feedback resource location determined in a case that the downlink reference timing and the SL timing are all aligned.

It should be noted that $T_{TA}$ is a timing advance of uplink to downlink on the target reference object, or is a timing advance of uplink to downlink on the TAG corresponding to the target reference object. $T_{TA}$ may be replaced with, $N_{TA}$ that is, the first timing information is the first sub-timing advance value. For example, the foregoing formula $$T_{DL} - \frac{T_{TA}}{2} + K_{SL} \times T_{slot}$$

may be replaced with a formula $$T_{DL} - \frac{N_{TA}}{2} + K_{SL} \times T_{slot}.$$

It may be understood that, $N_{TA}$ in this application may also be replaced with $T_{TA}$.

It should be noted that $T_{DL}$ is a time for receiving the first control signaling based on the timing information (for example, downlink timing information) of the target reference object, or is a time for receiving the first control signaling based on the timing information (for example, downlink timing information) of the TAG corresponding to the target reference object. The downlink reference timing (which is used to determine an associated feedback resource location) is downlink frame timing determined based on the timing information (for example, downlink timing information) of the target reference object, or is downlink frame timing determined based on the timing information (for example, downlink timing information) of the TAG corresponding to the target reference object.

It should be noted that the target reference object corresponding to $T_{TA}$, the target reference object corresponding to, $N_{TA}$ the target reference object corresponding to $T_{DL}$, and the target reference object corresponding to the downlink reference timing may be all the same, or may be partly the same, or may be all different. This is not limited in this embodiment of this application. Example 1: Both the target reference object corresponding to $T_{DL}$ and/or the target reference object corresponding to the downlink reference timing are cells for transmitting SL DCI, and the target reference object corresponding to $T_{TA}$ is the cell in which the target SL resource is located.

It should be noted that the first TAG related to (or corresponding to) the target reference object corresponding to $T_{TA}$, the first TAG related to (or corresponding to) the target reference object corresponding to $T_{DL}$, and the first TAG related to (or corresponding to) the target reference object corresponding to the downlink reference timing may be all the same, or may be partly the same, or may be all different. This is not limited in this embodiment of this application.

It should be noted that $N_{TA}$, $T_{TA}$, $T_{DL}$ and the downlink reference timing may be determined based on the timing information of the target reference object, or may be determined based on timing information corresponding to the TAG corresponding to the target reference object.

Optionally, in this embodiment of this application, in a case that the terminal is corresponding to a plurality of first reference objects, at least one of the following is met:

one first reference object includes an uplink resource used to transmit SL feedback information;

one first reference object is used to transmit first control signaling; or at least two first reference objects are used to transmit first control signaling;

where the first reference object is a cell or a carrier; and the first control signaling includes at least one of the following: an SL SPS configuration, an SL CG configuration, or SL DCI.

It should be noted that the plurality of first reference objects corresponding to the terminal may be understood as any one of the following: The terminal is configured or preconfigured or indicated or scheduled or supported by a plurality of SL cells; or the terminal is configured or preconfigured or indicated or scheduled or supported by a plurality of SL carriers; or the terminal is configured or preconfigured or indicated or scheduled or supported by a preset quantity of SL cells, or the terminal is configured or preconfigured or indicated or scheduled or supported by a preset quantity of SL carriers. That is, it may be understood that the terminal performs SL CA or supports SL CA.

In an example, that one first reference object is used to transmit first control signaling may meet: In a case that the first control signaling is SL DCI, one first reference object is used to transmit the first control signaling.

Further, optionally, in this embodiment of this application, the first reference object used to transmit the first control signaling is a first reference object corresponding to the synchronization reference of the terminal.

Optionally, in this embodiment of this application, in a case that one first reference object includes an uplink resource used to transmit SL feedback information, the target reference object is a cell or a carrier that includes an uplink resource used to transmit SL feedback information;

or in a case that one first reference object is used to transmit first control signaling, the target reference object is a cell or a carrier used to transmit the first control signaling;

or in a case that at least two first reference objects are used to transmit first control signaling, the target reference object is any one of the following: a cell or a carrier corresponding to a synchronization reference, a cell or a carrier in which the target SL resource is located, and a cell or a carrier in which first control signaling corresponding to the target SL resource is located;

or the target reference object is a cell or a carrier corresponding to a synchronization reference;

where the first reference object is a cell or a carrier; and the first control signaling includes at least one of the following: an SL SPS configuration, an SL CG configuration, or SL DCI.

It should be noted that, in a case of SL CA, TAGs of different SL carriers and/or timing considered for SL resources needs to be unified; otherwise, different timing may lead to a problem of relatively high complexity and relatively high resource utilization. Therefore, in a case that one first reference object is used to transmit first control signaling, the target reference object is a cell or a carrier used to transmit the first control signaling.

The following uses at least three examples to illustrate a determining process of the target information and/or the target SL resource.

It should be noted that, in a case of SL CA, TAGs of different SL carriers and/or timing considered for resources needs to be unified; otherwise, different timing may lead to a problem of relatively high complexity and relatively high resource utilization. Therefore, in a case that at least two first reference objects are used to transmit the first control signaling, the target reference object is a cell or a carrier corresponding to the synchronization reference.

It may be understood that the cell or the carrier in which the first control signaling is located is a cell or carrier for transmitting the first control signaling.

Example 1: In a case that an SL resource on a cell 1 is scheduled by SL DCI on a cell 3, and an SL resource on a cell 2 is scheduled by SL DCI on a cell 4, if the terminal obtains the synchronization reference on the cell 1, the SL resource and/or the target information of the cell 1 may be determined according to the cell 1, and/or the SL resource and/or the target information of the cell 2 are determined according to the cell 1. For example, the SL resource and/or a TAG of the cell 1 are determined according to the cell 1, and/or the SL resource and/or a TAG of the cell 2 are determined according to the cell 1.

For example, in a case that the at least two first reference objects are used to transmit the first control signaling, the target reference objects are cells or carriers in which the SL resources are respectively located.

Example 2: If an SL resource on a cell 1 is scheduled by SL DCI on a cell 3, and an SL resource on a cell 2 is scheduled by SL DCI on a cell 4, the SL resource and/or the target information of the cell 1 may be determined according to the cell 1, and/or the SL resource and/or the target information of the cell 2 may be determined according to the cell 2. For example, the SL resource and/or a TAG of the cell 1 are determined according to the cell 1, and/or the SL resource and/or a TAG of the cell 2 are determined according to the cell 2.

For example, in a case that the at least two first reference objects are used to transmit the first control signaling, the target reference objects are cells or carriers in which the first control signaling corresponding to the SL resources is respectively located.

Example 3: If an SL carrier 1 is scheduled by the SL DCI on the cell 3 and an SL carrier 2 is scheduled by the SL DCI on the cell 4, the SL resource and/or the target information of the SL carrier 1 may be determined according to the cell 3, and/or the SL resource and/or the target information of the SL carrier 2 may be determined according to the cell 4. For example, the SL resource and/or a TAG of the SL carrier 1 are determined according to the cell 3, and/or the SL resource and/or a TAG of the SL carrier 2 are determined according to the cell 4.

Optionally, in this embodiment of this application, the method may further include the following step 203:

Step 203: Obtain a target timing advance command.

Precision of the target timing advance command is related to any one of the following: an SL subcarrier spacing (SCS), a UL SCS, and a first SCS in the SL SCS.

For example, the target timing advance command includes at least one of the following: a timing advance command corresponding to the target SL resource, or a timing advance command corresponding to the first TAG.

For example, the SL SCS may include one SCS, or may include a plurality of SCSs. This is not limited in this application. The UL SCS may include one SCS, or may include a plurality of SCSs. This is not limited in this application. For example, if there are a plurality of active UL BWPs in one TAG, the timing advance command is described relative to the largest SCS in SCSs and SL SCSs of the plurality of active UL BWPs, or defined according to the largest SCS.

For example, the target timing advance command may be a target timing advance command sent (or configured) by the network side device to the terminal, or a target timing advance command sent (or configured) by another terminal to the terminal, which is not limited in this embodiment of this application.

It should be noted that, that the precision of the target timing advance command is related to an SCS may be understood as that the precision is an integer multiple of a time unit corresponding to the SCS. In an example, the indication precision of the target timing advance command is $16 \cdot 64 \cdot T_c/2^\mu$, where the SCS divided by 15 kHz is a pth power of 2. Optionally, the time unit is $16 \cdot 64 \cdot T_c/2^\mu$. Alternatively, it may be explained that the precision of the target timing advance command is relative to an SCS. Alternatively, it may be explained that the precision of the target timing advance command is relative to a time unit corresponding to an SCS.

Optionally, in this embodiment of this application, the configuration of the network side device ensures that the SL SCS is not greater than (that is, is less than or equal to) a Uu SCS. Further, the configuration of the network side device ensures that the SL SCS is not greater than a Uu SCS corresponding to a same TAG. Alternatively, the configuration of the network side device ensures that the SL SCS is not less than (that is, is greater than or equal to) a Uu SCS. Further, the configuration of the network side device ensures that the SL SCS is not less than a Uu SCS corresponding to a same TAG.

Optionally, in this embodiment of this application, the terminal considers or expects that the SL SCS is not greater than the Uu SCS. Further, the terminal considers or expects that the SL SCS is not greater than a Uu SCS corresponding to a same TAG. Alternatively, the terminal considers or expects that the SL SCS is not less than a Uu SCS. Further, the terminal considers or expects that the SL SCS is not less than a Uu SCS corresponding to a same TAG.

It should be noted that the Uu SCS may be understood as an SCS of Uu interface transmission or resource, and includes a UL SCS and/or a DL SCS. In an example, the first SCS may be a UL SCS, and further may be an SCS of a UL active BWP.

Optionally, in this embodiment of this application, the precision of the target timing advance command meets any one of the following:

in a case that the target SL resource is located at a preset frequency domain location, the precision of the target timing advance command is related to the SL SCS; and if there are a plurality of SL SCSs, the precision of the target timing advance command is related to an SL SCS that meets a second condition in the plurality of SL SCSs.

For example, that the target SL resource is located at a preset frequency domain location includes at least one of the following: located in a non-shared resource, located in an ITS band, located in an SL dedicated resource, located in a resource with only a PC5 interface, or located in a resource that does not coexist with another technology.

For example, the SL SCS that meets the second condition includes any one of the following: a maximum SL SCS, a minimum SL SCS, an SL SCS of a preset carrier or a preset cell, and an SL SCS corresponding to a maximum quantity of carriers or cells.

Optionally, in this embodiment of this application, the UL SCS and the SL SCS may be corresponding to a same TAG, or may be corresponding to different TAGs, which is not limited in this embodiment of this application.

It should be noted that, in a case that the precision of the target timing advance command is the precision of the timing advance command corresponding to the target SL resource, the precision of the timing advance command corresponding to the UL BWP in the first TAG may be the same as or different from the precision of the timing advance command corresponding to the target SL resource, which is not limited in this embodiment of this application. In a case that the precision of the target timing advance command is the precision of the timing advance command corresponding to the first TAG, the precision of the timing advance command corresponding to the UL BWP and the SL BWP in the first TAG may be the same as the precision of the timing advance command corresponding to the first TAG.

Optionally, in this embodiment of this application, in a case that the target timing advance command is the timing advance command corresponding to the first TAG, the first SCS may be a preset SCS in the UL SCS and the SL SCS in the first TAG. For example, the first SCS may be a maximum SCS or a minimum SCS in the UL SCS and the SL SCS in the first TAG. This is not limited in this embodiment of this application.

Further, the first SCS may be a preset SCS in the SCS and the SL SCS of the active UL BWP in the first TAG. For example, the first SCS may be a maximum SCS or a minimum SCS in the SCS and the SL SCS of the active UL BWP.

Example 1: The SL BWP belongs to TAG2. If a maximum SCS in active UL BWPs of all carriers in TAG2 is 30 kHz, and the SL BWP is 60 kHz, precision of a timing advance command corresponding to TAG2 is 60 kHz.

Example 2: The SL BWP belongs to TAG2. If a maximum SCS in active UL BWPs of all carriers in TAG2 is 30 kHz, and the SL BWP is 60 kHz, precision of a UL timing advance command corresponding to TAG2 is 30 kHz, and precision of an SL timing advance command corresponding to TAG2 is 60 kHz.

The following uses at least four examples to illustrate a process of determining the target information.

Example 1: The target SL resource is an SL resource scheduled by the SL DCI, the SL DCI indicates an interval between DCI and the first SL transmission scheduled by the DCI, and the first SL transmission starts at a first sidelink slot that is not earlier than a moment $$T_{DL} - \frac{T_{TA}}{2} + K_{SL} \times T_{slot}$$

in the resource pool. $T_{DL}$ is a start point of a downlink slot receiving the DCI, and is a timing advance of the cell in which the target SL resource is located.

Example 2: The target SL resource is an SL resource scheduled by the SL DCI, the SL DCI indicates an interval between DCI and the first SL transmission scheduled by the DCI, and the first SL transmission starts at a first sidelink slot that is not earlier than a moment $$T_{DL} - \frac{T_{TA}}{2} + K_{SL} \times T_{slot}$$

in the resource pool. $T_{DL}$ is a start point of a downlink slot receiving the DCI, and is a timing advance of the cell in which the SL HARQ-ACK is located.

Example 3: The target SL resource is an SL resource scheduled by the SL DCI, the SL DCI indicates an interval between DCI and the first SL transmission scheduled by the DCI, and the first SL transmission starts at a first sidelink slot that is not earlier than a moment $$T_{DL} - \frac{T_{TA}}{2} + K_{SL} \times T_{slot}$$

in the resource pool. $T_{DL}$ is a start point of a downlink slot receiving the DCI, and is a timing advance of the cell in which the SL DCI is located.

Example 4: If the terminal is configured with the SL CG type1; or the terminal is configured with the SL CG type1 and is not configured with the SL CG type2 and the SL DCI, $T_{TA}$ or the terminal is configured with the SL CG type1 and is not configured with the SL DCI, that needs to considered by the target SL resource corresponding to the SL CG type1 is a cell in which the SL CG type1 is configured or a cell in which the target SL resource is located.

According to the information determining method provided in this embodiment of this application, the information determining apparatus determines, according to a target condition and/or a target reference object, target information related to a target sidelink SL resource; where the target information indicates any one of the following: at least one of a first timing advance group TAG or first timing information; at least one of that the target SL resource does not belong to any TAG or that the target SL resource does not have timing information; the first TAG and the target SL resource do not have timing information; and the first timing information and the target SL resource do not belong to any TAG. In this way, the information determining apparatus can quickly determine required information according to the target condition and/or the target reference object, for example, determine a required TAG from a plurality of TAGs.

An embodiment of this application provides an information sending method. The information sending method may be applied to a communication device, that is, the information sending method may be performed by software or hardware installed in the communication device. The communication device may be a network side device, a terminal, or the like.

Based on this, as shown in FIG. 6, the information sending method may include the following step 301:

Step 301: Send a target timing advance command to a terminal.

Precision of the target timing advance command is related to any one of the following: an SL carrier spacing SCS, a UL SCS, and a first SCS in the SL SCS.

Correspondingly, the terminal may receive the target timing advance command sent by the communication device.

For example, the target timing advance command includes at least one of the following: a timing advance command corresponding to the target SL resource, or a timing advance command corresponding to the first TAG.

For example, the SL SCS may include one SCS, or may include a plurality of SCSs. This is not limited in this embodiment of this application. The UL SCS may include one SCS, or may include a plurality of SCSs. This is not limited in this embodiment of this application.

It should be noted that, that the precision of the target timing advance command is related to an SCS may be understood as that the precision is an integer multiple of a time unit corresponding to the SCS. In an example, the indication precision of the target timing advance command is $16 \cdot 64 \cdot T_c/2^\mu$, where the SCS divided by 15 kHz is a pth power of 2. Optionally, the time unit is $16 \cdot 64 \cdot T_c/2^\mu$. Alternatively, it may be explained that the precision of the target timing advance command is relative to an SCS. Alternatively, it may be explained that the precision of the target timing advance command is relative to a time unit corresponding to an SCS.

Optionally, in this embodiment of this application, the configuration of the network side device ensures that the SL SCS is not greater than a Uu SCS. Further, the configuration of the network side device ensures that the SL SCS is not greater than a Uu SCS corresponding to a same TAG. Alternatively, the configuration of the network side device ensures that the SL SCS is not less than a Uu SCS. Further, the configuration of the network side device ensures that the SL SCS is not less than a Uu SCS corresponding to a same TAG.

Optionally, in this embodiment of this application, the terminal considers or expects that the SL SCS is not greater than the Uu SCS. Further, the terminal considers that the SL SCS is not greater than a Uu SCS corresponding to a same TAG. Alternatively, the terminal considers or expects that the SL SCS is not less than a Uu SCS. Further, the terminal considers or expects that the SL SCS is not less than a Uu SCS corresponding to a same TAG.

It should be noted that the Uu SCS may be understood as a Uu interface transmission or resource SCS, and includes a UL SCS and/or a DL SCS. In an example, the first SCS may be a UL SCS, and further may be an SCS of a UL active BWP.

Optionally, in this embodiment of this application, the precision of the target timing advance command meets any one of the following:

in a case that the target SL resource is located at a preset frequency domain location, the precision of the target timing advance command is related to the SL SCS; and if there are a plurality of SL SCSs, the precision of the target timing advance command is related to an SL SCS that meets a second condition in the plurality of SL SCSs.

For example, that the target SL resource is located at a preset frequency domain location includes at least one of the following: located in a non-shared resource, located in an ITS band, located in an SL dedicated resource, located in a resource with only a PC5 interface, or located in a resource that does not coexist with another technology.

For example, the SL SCS that meets the second condition includes any one of the following: a maximum SL SCS, a minimum SL SCS, an SL SCS of a preset carrier or a preset cell, and an SL SCS corresponding to a maximum quantity of carriers or cells.

Optionally, in this embodiment of this application, the UL SCS and the SL SCS may be corresponding to a same TAG, or may be corresponding to different TAGs, which is not limited in this embodiment of this application.

It should be noted that, in a case that the precision of the target timing advance command is the precision of the timing advance command corresponding to the target SL resource, the precision of the timing advance command corresponding to the UL BWP in the first TAG may be the same as or different from the precision of the timing advance command corresponding to the target SL resource, which is not limited in this embodiment of this application. In a case that the precision of the target timing advance command is the precision of the timing advance command corresponding to the first TAG, the precision of the timing advance command corresponding to the UL BWP and the SL BWP in the first TAG may be the same as the precision of the timing advance command corresponding to the first TAG.

Optionally, in this embodiment of this application, in a case that the target timing advance command is the timing advance command corresponding to the first TAG, the first SCS may be a preset SCS in the UL SCS and the SL SCS in the first TAG. For example, the first SCS may be a maximum SCS or a minimum SCS in the UL SCS and the SL SCS in the first TAG. This is not limited in this embodiment of this application.

Further, the first SCS may be a preset SCS in the SCS and the SL SCS of the active UL BWP in the first TAG. For example, the first SCS may be a maximum SCS or a minimum SCS in the SCS and the SL SCS of the active UL BWP.

Example 1: The SL BWP belongs to TAG2. If a maximum SCS in active UL BWPs of all carriers in TAG2 is 30 kHz, and the SL BWP is 60 kHz, precision of a timing advance command corresponding to TAG2 is 60 kHz.

Example 2: The SL BWP belongs to TAG2. If a maximum SCS in active UL BWPs of all carriers in TAG2 is 30 kHz, and the SL BWP is 60 kHz, precision of a UL timing advance command corresponding to TAG2 is 30 kHz, and precision of an SL timing advance command corresponding to TAG2 is 60 kHz.

According to the information sending method provided in this embodiment of this application, the information sending apparatus may send the target timing advance command to the terminal, so that the terminal can quickly adjust the timing advance value according to the target timing advance command.

Optionally, in this embodiment of this application, the foregoing method may further include the following step 302:

Step 302: The information sending apparatus sends target configuration information to the terminal.

The target configuration information includes at least one of the following:

one first reference object includes an uplink resource used to transmit SL feedback information;

one first reference object is used to transmit first control signaling; or at least two first reference objects are used to transmit first control signaling;

where the first reference object is a cell or a carrier; and the first control signaling includes at least one of the following: an SL SPS configuration, an SL CG configuration, or SL DCI.

It should be noted that, in the information determining method provided in this embodiment of this application, the execution entity may be an information determining apparatus, or a control module that is in the information determining apparatus and that is used to perform the information determining method. In this embodiment of this application, that the information determining apparatus performs the information determining method is used as an example to describe the information determining apparatus provided in this embodiment of this application.

FIG. 7 is a possible schematic structural diagram of an information determining apparatus according to an embodiment of this application. As shown in FIG. 7, the information determining apparatus 400 includes a determining module 401, where the determining module 401 is configured to determine, according to a target condition and/or a target reference object, target information related to a target sidelink SL resource; where the target information indicates any one of the following: at least one of a first timing advance group TAG or first timing information; at least one of that the target SL resource does not belong to any TAG or that the target SL resource does not have timing information; the first TAG and the target SL resource do not have timing information; and the first timing information and the target SL resource do not belong to any TAG.

Optionally, the first timing information includes at least one of the following: a first timing advance value or downlink reference timing.

Optionally, the target reference object is at least one of the following: a cell or a carrier corresponding to a synchronization reference, a preset cell or carrier, a cell or a carrier for transmitting first control signaling, a cell or a carrier in which a resource used to transmit SL feedback information is located, or a cell or a carrier in which the target SL resource is located.

Optionally, in a case that the target condition includes that the target SL resource meets the first condition, the target information indicates that the target SL resource belongs to a predetermined TAG or does not belong to any TAG, and the first TAG is a predetermined TAG. The first condition includes at least one of the following: located in a non-shared resource, located in an ITS band, located in an SL dedicated resource, located in a resource with only a PC5 interface, or located in a resource that does not coexist with another technology.

Optionally, the target condition includes at least one of the following: the target SL resource meets a first condition, or a synchronization reference of a terminal is not a base station or another terminal covered by the base station; and then the target information indicates that the first timing advance value does not exist; or the target information is the first timing advance value, and the first timing advance value is 0; where the first condition includes at least one of the following: located in a non-shared resource, located in an ITS band, located in an SL dedicated resource, located in a resource with only a PC5 interface, or located in a resource that does not coexist with another technology.

Optionally, in a case that the target information indicates the first TAG and/or the first timing information, the target information is information corresponding to the target reference object.

Optionally, the first timing information is determined based on the first TAG.

Optionally, the determining module 401 is further configured to: in a case that the target SL resource meets the first condition, determine that the target reference object is a preset reference object, where the preset reference object includes a preset cell or a preset carrier; the target information is information corresponding to the preset reference object; and the first condition includes at least one of the following: located in a non-shared resource, located in an ITS band, located in an SL dedicated resource, located in a resource with only a PC5 interface, or located in a resource that does not coexist with another technology.

Optionally, the determining module 401 is further configured to determine a resource location of the target SL resource according to the target information.

Optionally, the target information includes first timing information; and the first timing information is any one of the following: timing information corresponding to a cell or a carrier in which the target SL resource scheduled or activated or deactivated by SL DCI is located, timing information corresponding to a cell or a carrier in which the target SL resource configured by an SL configured grant CG configuration is located, and timing information corresponding to a cell or a carrier in which the target SL resource configured by an SL semi persistent scheduling SPS configuration is located.

Optionally, the target information includes a first TAG; and the first TAG is any one of the following: a TAG corresponding to a cell or a carrier in which the target SL resource scheduled or activated or deactivated by SL DCI is located, a TAG corresponding to a cell or a carrier in which the target SL resource configured by an SL configured grant CG configuration is located, and a TAG corresponding to a cell or a carrier in which the target SL resource configured by an SL semi persistent scheduling SPS configuration is located.

Optionally, the target SL resource includes at least one of the following: a first SL transmission resource indicated or configured or scheduled or activated or deactivated by first control signaling, or a first feedback resource corresponding to the first control signaling; and the first control signaling includes at least one of the following: an SL SPS configuration, an SL CG configuration, or SL DCI.

Optionally, the resource location of the target SL resource is determined according to a first location obtained after a target offset is performed based on the target location; where the target location is determined according to first control signaling, the target offset is determined according to the target information, and the first control signaling includes at least one of the following: an SL SPS configuration, an SL CG configuration, or SL DCI.

Optionally, in a case that the target SL resource includes a second SL transmission resource indicated by the SL DCI, the second SL transmission resource is located on a preset resource that is not earlier than a first location, and the first location is determined based on the target information.

Optionally, in a case that the target SL resource includes a third SL transmission resource in the SL CG configuration, the third SL transmission resource is located at a first location; and the first location is determined based on a target location, and the target location is determined based on downlink timing and the SL CG configuration.

Optionally, in a case that the target SL resource includes a second feedback resource associated with a fourth SL transmission resource, the second feedback resource is located at a first location determined in a case that downlink reference timing and SL timing are aligned.

Optionally, in a case that the terminal is corresponding to a plurality of first reference objects, at least one of the following is met: one first reference object includes an uplink resource used to transmit SL feedback information; one first reference object is used to transmit first control signaling; or at least two first reference objects are used to transmit first control signaling, where the first reference object is a cell or a carrier; and the first control signaling includes at least one of the following: an SL SPS configuration, an SL CG configuration, or SL DCI.

Optionally, the first reference object used to transmit the first control signaling is a first reference object corresponding to the synchronization reference of the terminal.

Optionally, in a case that one first reference object includes an uplink resource used to transmit SL feedback information, the target reference object is a cell or a carrier that includes an uplink resource used to transmit SL feedback information; or in a case that one first reference object is used to transmit first control signaling, the target reference object is a cell or a carrier used to transmit the first control signaling; or in a case that at least two first reference objects are used to transmit first control signaling, the target reference object is any one of the following: a cell or a carrier corresponding to a synchronization reference, a cell or a carrier in which the target SL resource is located, and a cell or a carrier in which first control signaling corresponding to the target SL resource is located; or the target reference object is a cell or a carrier corresponding to a synchronization reference, where the first reference object is a cell or a carrier; and the first control signaling includes at least one of the following: an SL SPS configuration, an SL CG configuration, or SL DCI.

Figures 8, 9, 10:
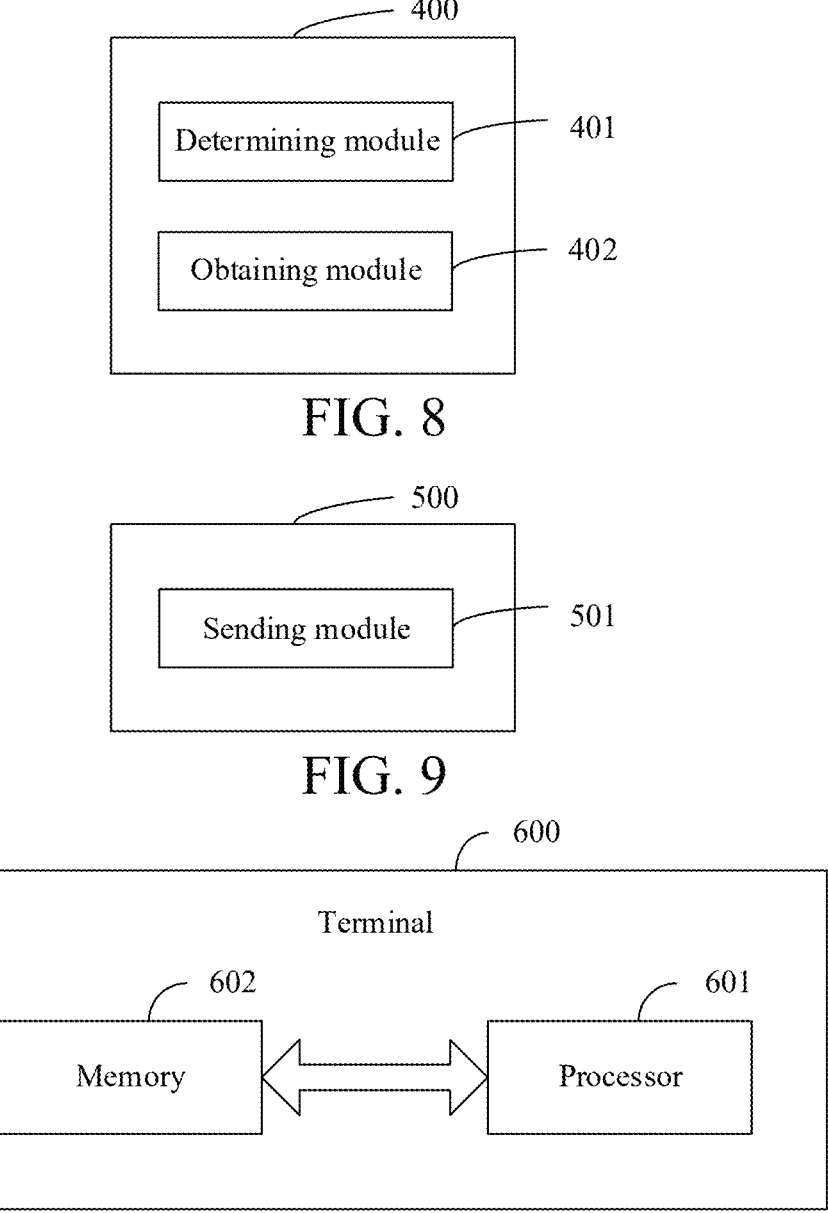
FIG. 8 is a second schematic structural diagram of an information determining apparatus according to an embodiment of this application.
FIG. 9 is a schematic structural diagram of an information sending apparatus according to an embodiment of this application.
FIG. 10 is a schematic structural diagram of a terminal according to an embodiment of this application.

Optionally, as shown in FIG. 8, the apparatus 400 further includes an obtaining module 402. The obtaining module 402 is configured to obtain a target timing advance command, where precision of the target timing advance command is related to any one of the following: an SL carrier spacing SCS, a UL SCS, and a first SCS in the SL SCS.

Optionally, the UL SCS and the SL SCS are corresponding to a same TAG.

Optionally, the precision of the target timing advance command meets any one of the following: in a case that the target SL resource is located at a preset frequency domain location, the precision of the target timing advance command is related to the SL SCS; and if there are a plurality of SL SCSs, the precision of the target timing advance command is related to an SL SCS that meets a second condition in the plurality of SL S Optionally, the SL SCS that meets the second condition includes any one of the following: a maximum SL SCS, a minimum SL SCS, an SL SCS of a preset carrier or a preset cell, and an SL SCS corresponding to a maximum quantity of carriers or cells.

Optionally, the target timing advance command includes at least one of the following: a timing advance command corresponding to the target SL resource, or a timing advance command corresponding to the first TAG.

According to the information determining apparatus provided in this embodiment of this application, the information determining apparatus determines, according to a target condition and/or a target reference object, target information related to a target sidelink SL resource; where the target information indicates any one of the following: at least one of a first timing advance group TAG or first timing information; at least one of that the target SL resource does not belong to any TAG or that the target SL resource does not have timing information; the first TAG and the target SL resource do not have timing information; and the first timing information and the target SL resource do not belong to any TAG. In this way, the information determining apparatus can quickly determine required information according to the target condition and/or the target reference object, for example, determine a required TAG from a plurality of TAGs.

The information determining apparatus in this embodiment of this application may be an apparatus, or may be a component, an integrated circuit, or a chip in a terminal. The apparatus may be a mobile terminal, or may be a non-mobile terminal. For example, the mobile terminal may include but is not limited to the type of the terminal 11 listed above. The non-mobile terminal may be a server, a network attached storage (NAS), a personal computer (PC), a television (TV), a teller machine, or a self-service machine. This is not specifically limited in this embodiment of this application.

The information determining apparatus in this embodiment of this application may be an apparatus with an operating system. The operating system may be an Android operating system, an iOS operating system, or another possible operating system. This is not specifically limited in the embodiments of this application.

The information determining apparatus provided in this embodiment of this application can implement processes implemented in the method embodiment of FIG. 5, and achieve a same technical effect. To avoid repetition, details are not described herein again.

It should be noted that, in the information sending method provided in this embodiment of this application, the execution entity may be an information sending apparatus, or a control module that is in the information sending apparatus and that is used to perform the information sending method. In this embodiment of this application, that the information sending apparatus performs the information determining method is used as an example to describe the information sending apparatus provided in this embodiment of this application.

FIG. 9 is a possible schematic structural diagram of an information sending apparatus according to an embodiment of this application. As shown in FIG. 9, the information sending apparatus 500 includes a sending module 501, where the sending module 501 is configured to send a target timing advance command to a terminal; where precision of the target timing advance command is related to any one of the following: an SL carrier spacing SCS, a UL SCS, and a first SCS in the SL SCS.

Optionally, the UL SCS and the SL SCS are corresponding to a same TAG.

Optionally, the precision of the target timing advance command meets any one of the following: in a case that the target SL resource is located at a preset frequency domain location, the precision of the target timing advance command is related to the SL SCS; and if there are a plurality of SL SCSs, the precision of the target timing advance command is related to an SL SCS that meets a second condition in the plurality of SL S Optionally, the SL SCS that meets the second condition includes any one of the following: a maximum SL SCS, a minimum SL SCS, an SL SCS of a preset carrier or a preset cell, and an SL SCS corresponding to a maximum quantity of carriers or cells.

Optionally, the target timing advance command includes at least one of the following: a timing advance command corresponding to the target SL resource, or a timing advance command corresponding to the first TAG.

According to the information sending apparatus provided in this embodiment of this application, the information sending apparatus may send the target timing advance command to the terminal, so that the terminal can quickly adjust the timing advance value according to the target timing advance command.

The information sending apparatus in this embodiment of this application may be an apparatus, or may be a component, an integrated circuit, or a chip in a communication device. The apparatus may be a network side device, or may be a terminal. For example, the network side device may be a base station or a core network. The base station may be referred to as a NodeB, an evolved NodeB, an access point, a base transceiver station (BTS), a radio base station, or the like. The terminal may be a mobile terminal or a non-mobile terminal. The mobile terminal may include but is not limited to a type of the foregoing listed terminal 11. The non-mobile terminal may be a server, a network attached storage (NAS), a personal computer (PC), a television (TV), a teller machine, or a self-service machine. This is not specifically limited in this embodiment of this application.

The information sending apparatus in this embodiment of this application may be an apparatus with an operating system. The operating system may be an Android operating system, an iOS operating system, or another possible operating system. This is not specifically limited in the embodiments of this application.

The information sending apparatus provided in this embodiment of this application can implement processes implemented in the method embodiment of FIG. 6, and achieve a same technical effect. To avoid repetition, details are not described herein again.

Optionally, as shown in FIG. 10, an embodiment of this application further provides a terminal 600. The terminal 600 includes a processor 601, a memory 602, and a program or instructions stored in the memory 602 and capable of running on the processor 601. When the program or the instructions are executed by the processor 601, each process in the foregoing information determining method embodiment is implemented, and a same technical effect can be achieved. To avoid repetition, details are not described herein again.

Figure 11:
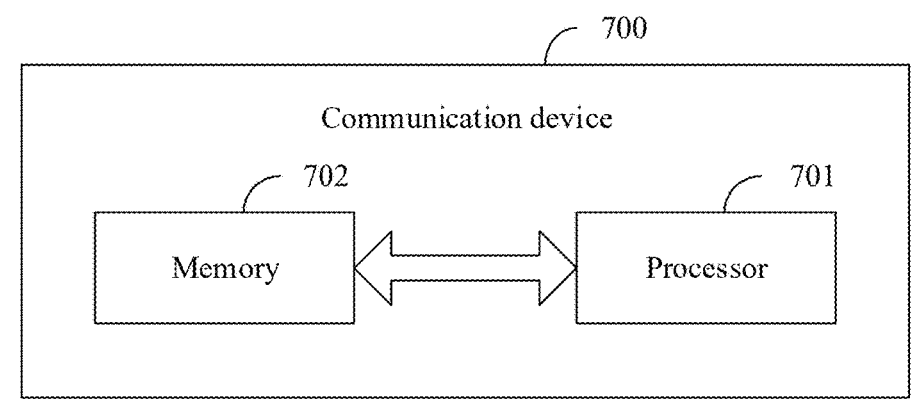
FIG. 11 is a schematic structural diagram of a communication device according to an embodiment of this application.

Optionally, as shown in FIG. 11, an embodiment of this application further provides a communication device 700, including a processor 701, a memory 702, and a program or instructions stored in the memory 702 and capable of running on the processor 701. For example, when the communication device 700 is a terminal, each process of the foregoing information sending method embodiment is implemented when the program or the instructions are executed by the processor 701, and a same technical effect can be achieved. When the communication device 700 is a network side device, each process of the foregoing information sending method embodiment is implemented when the program or the instructions are executed by the processor 701, and a same technical effect can be achieved. To avoid repetition, details are not described herein again.

Figure 12:
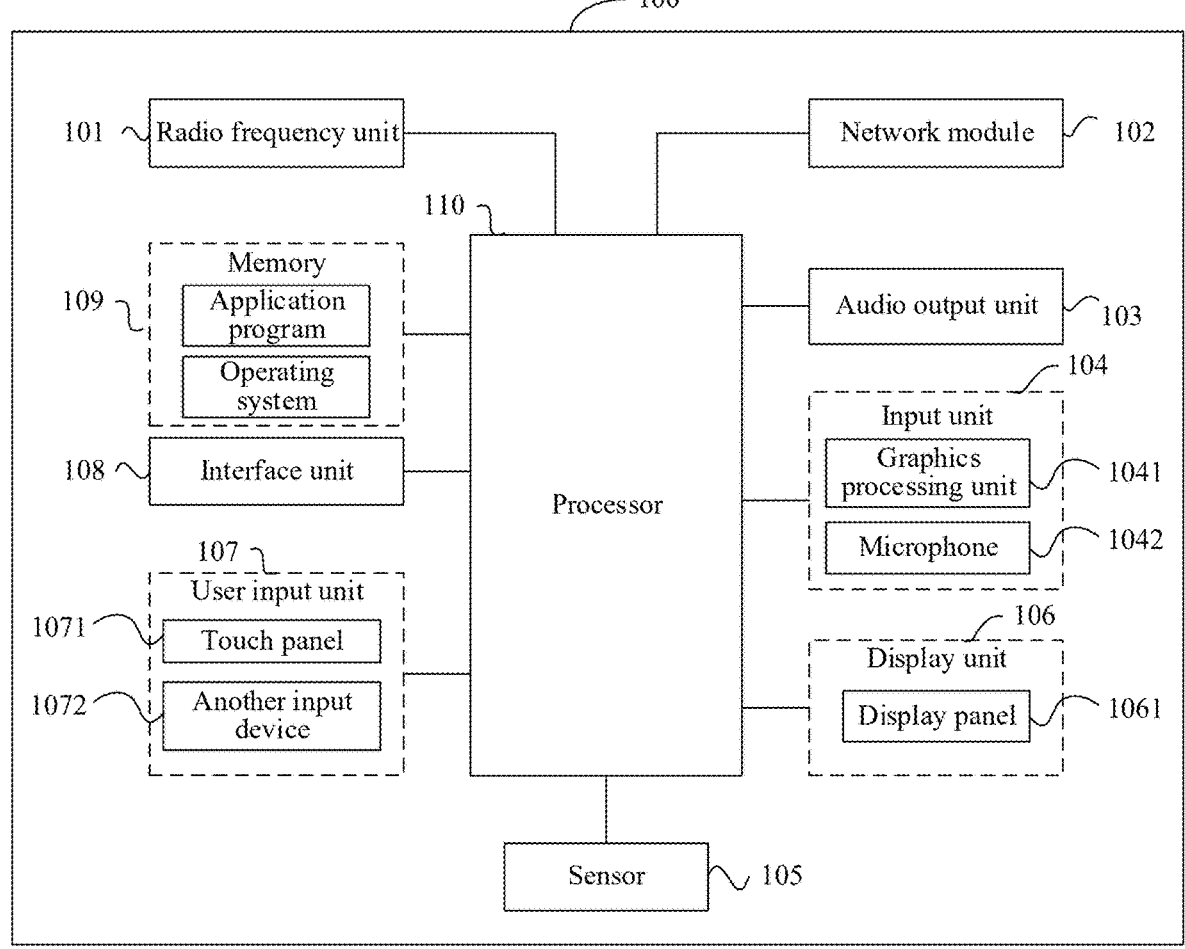
FIG. 12 is a schematic structural diagram of a terminal according to an embodiment of this application.

FIG. 12 is a schematic diagram of a hardware structure of a terminal according to an embodiment of this application.

The terminal 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the terminal 100 may further include a power supply (for example, a battery) that supplies power to each component. The power supply may be logically connected to the processor 110 by using a power management system, so as to manage functions such as charging, discharging, and power consumption by using the power management system. The terminal structure shown in FIG. 12 constitutes no limitation on the terminal, and the terminal may include more or fewer components than those shown in the figure, or combine some components, or have different component arrangements.

The processor 110 is configured to determine, according to a target condition and/or a target reference object, target information related to a target sidelink SL resource; where the target information indicates any one of the following: at least one of a first timing advance group TAG or first timing information; at least one of that the target SL resource does not belong to any TAG and or the target SL resource does not have timing information; the first TAG and the target SL resource do not have timing information; and the first timing information and the target SL resource do not belong to any TAG.

Optionally, the first timing information includes at least one of the following: a first timing advance value or downlink reference timing.

Optionally, the target reference object is at least one of the following: a cell or a carrier corresponding to a synchronization reference, a preset cell or carrier, a cell or a carrier for transmitting first control signaling, a cell or a carrier in which a resource used to transmit SL feedback information is located, or a cell or a carrier in which the target SL resource is located.

Optionally, in a case that the target condition includes that the target SL resource meets the first condition, the target information indicates that the target SL resource belongs to a predetermined TAG or does not belong to any TAG, and the first TAG is a predetermined TAG. The first condition includes at least one of the following: located in a non-shared resource, located in an ITS band, located in an SL dedicated resource, located in a resource with only a PC5 interface, or located in a resource that does not coexist with another technology.

Optionally, the target condition includes at least one of the following: the target SL resource meets a first condition, or a synchronization reference of a terminal is not a base station or another terminal covered by the base station; and then the target information indicates that the first timing advance value does not exist; or the target information is the first timing advance value, and the first timing advance value is 0; where the first condition includes at least one of the following: located in a non-shared resource, located in an ITS band, located in an SL dedicated resource, located in a resource with only a PC5 interface, or located in a resource that does not coexist with another technology.

Optionally, in a case that the target information indicates the first TAG and/or the first timing information, the target information is information corresponding to the target reference object.

Optionally, the first timing information is determined based on the first TAG.

Optionally, the processor 110 is further configured to: in a case that the target SL resource meets the first condition, determine that the target reference object is a preset reference object, where the preset reference object includes a preset cell or a preset carrier; the target information is information corresponding to the preset reference object; and the first condition includes at least one of the following: located in a non-shared resource, located in an ITS band, located in an SL dedicated resource, located in a resource with only a PC5 interface, or located in a resource that does not coexist with another technology.

Optionally, the processor 110 is further configured to determine a resource location of the target SL resource according to the target information.

Optionally, the target information includes first timing information; and the first timing information is any one of the following: timing information corresponding to a cell or a carrier in which the target SL resource scheduled or activated or deactivated by SL DCI is located, timing information corresponding to a cell or a carrier in which the target SL resource configured by an SL configured grant CG configuration is located, and timing information corresponding to a cell or a carrier in which the target SL resource configured by an SL semi persistent scheduling SPS configuration is located.

Optionally, the target information includes a first TAG; and the first TAG is any one of the following: a TAG corresponding to a cell or a carrier in which the target SL resource scheduled or activated or deactivated by SL DCI is located, a TAG corresponding to a cell or a carrier in which the target SL resource configured by an SL configured grant CG configuration is located, and a TAG corresponding to a cell or a carrier in which the target SL resource configured by an SL semi persistent scheduling SPS configuration is located.

Optionally, the target SL resource includes at least one of the following: a first SL transmission resource indicated or configured or scheduled or activated or deactivated by first control signaling, or a first feedback resource corresponding to the first control signaling; and the first control signaling includes at least one of the following: an SL SPS configuration, an SL CG configuration, or SL DCI.

Optionally, the resource location of the target SL resource is determined according to a first location obtained after a target offset is performed based on the target location; where the target location is determined according to first control signaling, the target offset is determined according to the target information, and the first control signaling includes at least one of the following: an SL SPS configuration, an SL CG configuration, or SL DCI.

Optionally, in a case that the target SL resource includes a second SL transmission resource indicated by the SL DCI, the second SL transmission resource is located on a preset resource that is not earlier than a first location, and the first location is determined based on the target information.

Optionally, in a case that the target SL resource includes a third SL transmission resource in the SL CG configuration, the third SL transmission resource is located at a first location; and the first location is determined based on a target location, and the target location is determined based on downlink timing and the SL CG configuration.

Optionally, in a case that the target SL resource includes a second feedback resource associated with a fourth SL transmission resource, the second feedback resource is located at a first location determined in a case that downlink reference timing and SL timing are aligned.

Optionally, in a case that the terminal is corresponding to a plurality of first reference objects, at least one of the following is met: one first reference object includes an uplink resource used to transmit SL feedback information; one first reference object is used to transmit first control signaling; or at least two first reference objects are used to transmit first control signaling, where the first reference object is a cell or a carrier; and the first control signaling includes at least one of the following: an SL SPS configuration, an SL CG configuration, or SL DCI.

Optionally, the first reference object used to transmit the first control signaling is a first reference object corresponding to the synchronization reference of the terminal.

Optionally, in a case that one first reference object includes an uplink resource used to transmit SL feedback information, the target reference object is a cell or a carrier that includes an uplink resource used to transmit SL feedback information; or in a case that one first reference object is used to transmit first control signaling, the target reference object is a cell or a carrier used to transmit the first control signaling; or in a case that at least two first reference objects are used to transmit first control signaling, the target reference object is any one of the following: a cell or a carrier corresponding to a synchronization reference, a cell or a carrier in which the target SL resource is located, and a cell or a carrier in which first control signaling corresponding to the target SL resource is located; or the target reference object is a cell or a carrier corresponding to a synchronization reference, where the first reference object is a cell or a carrier; and the first control signaling includes at least one of the following: an SL SPS configuration, an SL CG configuration, or SL DCI.

Optionally, the radio frequency unit 101 is configured to obtain a target timing advance command, where precision of the target timing advance command is related to any one of the following: an SL carrier spacing SCS, a UL SCS, and a first SCS in the SL SCS.

Optionally, the UL SCS and the SL SCS are corresponding to a same TAG.

Optionally, the precision of the target timing advance command meets any one of the following: in a case that the target SL resource is located at a preset frequency domain location, the precision of the target timing advance command is related to the SL SCS; and if there are a plurality of SL SCSs, the precision of the target timing advance command is related to an SL SCS that meets a second condition in the plurality of SL S Optionally, the SL SCS that meets the second condition includes any one of the following: a maximum SL SCS, a minimum SL SCS, an SL SCS of a preset carrier or a preset cell, and an SL SCS corresponding to a maximum quantity of carriers or cells.

Optionally, the target timing advance command includes at least one of the following: a timing advance command corresponding to the target SL resource, or a timing advance command corresponding to the first TAG.

According to the terminal provided in this embodiment of this application, the terminal determines, according to a target condition and/or a target reference object, target information related to a target sidelink SL resource; where the target information indicates any one of the following: at least one of a first timing advance group TAG or first timing information; at least one of that the target SL resource does not belong to any TAG or that the target SL resource does not have timing information; the first TAG and the target SL resource do not have timing information; and the first timing information and the target SL resource do not belong to any TAG. In this way, the terminal can quickly determine required information according to the target condition and/or the target reference object, for example, determine a required TAG from a plurality of TAGs.

It should be understood that, in this embodiment of this application, the input unit 104 may include a graphics processing unit (GPU) 1041 and a microphone 1042. The graphics processing unit 1041 processes image data of a still picture or a video obtained by an image capture apparatus (such as a camera) in a video capture mode or an image capture mode. The display unit 106 may include a display panel 1061. The display panel 1061 may be configured in a form such as a liquid crystal display or an organic light-emitting diode. The user input unit 107 may include a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a function key (such as a volume control key or an on/off key), a trackball, a mouse, and a joystick. Details are not described herein.

In this embodiment of this application, after the radio frequency unit 101 receives downlink data from the network side device, the downlink data is processed by the processor 110. In addition, uplink data is sent to the network side device. Generally, the radio frequency unit 101 includes but is not limited to: an antenna, at least one amplifier, a transceiver, a coupler, a low noise amplifier, and a duplexer.

The memory 109 may be configured to store a software program, instructions, and various data. The memory 109 may mainly include a program or instruction storage area and a data storage area, where the program or instruction storage area may store an operating system, an application program or an instruction (such as a sound play function or an image play function) required by at least one function, and the like. In addition, the memory 109 may include a high-speed random access memory, and may further include a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory, for example, at least one magnetic disk storage device, a flash memory device, or another non-volatile solid-state storage device.

The processor 110 may include one or more processing units. Optionally, the processor 110 may integrate an application processor and a modem processor. The application processor mainly processes an operating system, a user interface, an application program or an instruction, and the like. The modem processor mainly processes wireless communication such as a baseband processor. It may be understood that the modem processor may not be integrated into the processor 110.

Figure 13:
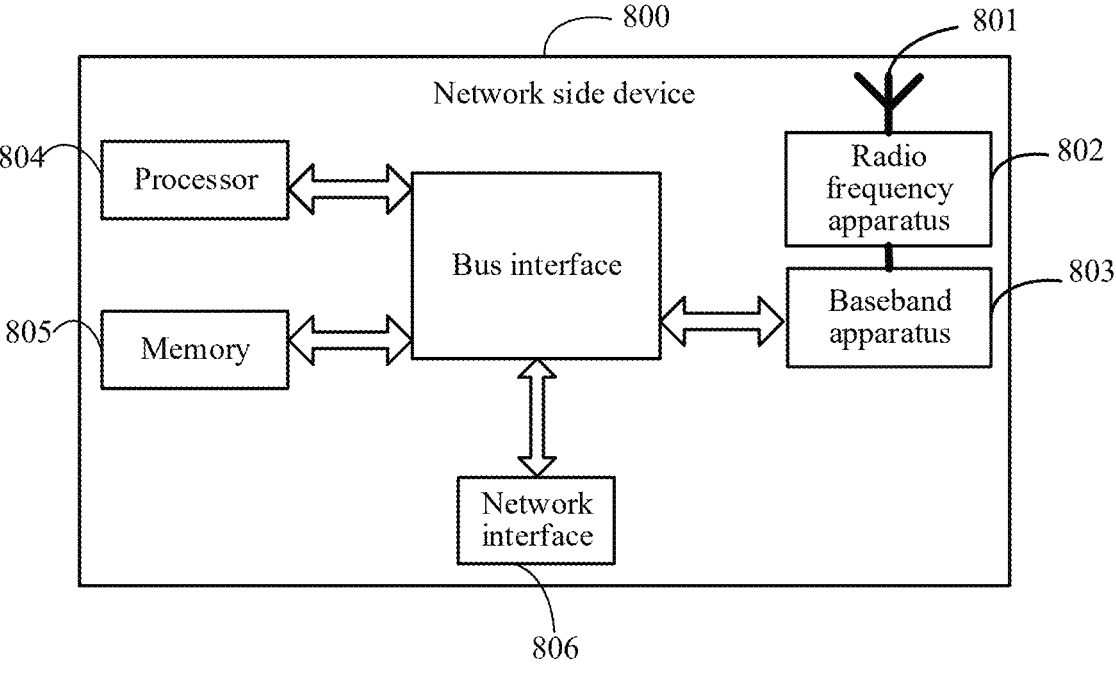
FIG. 13 is a schematic structural diagram of a network side device according to an embodiment of this application.

Specifically, that the communication device is a network side device is used as an example, an embodiment of this application further provides a network side device. As shown in FIG. 13, the network side device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes information that needs to be sent, and sends processed information to the radio frequency apparatus 802. The radio frequency apparatus 802 processes the received information, and sends processed information by using the antenna 801.

The frequency band processing apparatus may be located in the baseband apparatus 803, and the method performed by the network side device in the foregoing embodiment may be implemented in the baseband apparatus 803. The baseband apparatus 803 includes a processor 804 and a memory 805.

The baseband apparatus 803 may include, for example, at least one baseband board, where a plurality of chips are disposed on the baseband board. As shown in FIG. 13, one chip is, for example, the processor 804, which is connected to the memory 805, so as to schedule a program in the memory 805 to perform an operation of the network side device shown in the foregoing method embodiment.

The baseband apparatus 803 may further include a network interface 806, configured to exchange information with the radio frequency apparatus 802. For example, the interface is a common public radio interface (CPRI).

Specifically, the network side device in this embodiment of the present invention further includes instructions or a program stored in the memory 805 and capable of running on the processor 804. The processor 804 invokes the instructions or the program in the memory 805 to perform the method performed by the modules shown in FIG. 9, and achieves a same technical effect. To avoid repetition, details are not described herein again.

An embodiment of this application further provides a readable storage medium, where a program or instructions are stored on the readable storage medium, and the program or instructions are executed by a processor to implement processes in the embodiments of the foregoing information determining method or information sending method. A same technical effect can be achieved. To avoid repetition, details are not described herein again.

The processor is a processor in the terminal in the foregoing embodiments. The readable storage medium includes a computer-readable storage medium, such as a read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions of a network side device to implement processes in the embodiments of the foregoing information determining method or information sending method. A same technical effect can be achieved. To avoid repetition, details are not described herein again.

It should be understood that the chip mentioned in this embodiment of this application may also be referred to as a system-level chip, a system chip, a chip system, a system on chip, or the like.

It should be noted that the terms "include", "comprise", or any other variants thereof in this specification are intended to cover a non-exclusive inclusion, so that a process, method, object, or apparatus including a series of elements not only includes those elements, but also includes other elements which are not clearly listed, or include inherent elements of the process, method, object, or apparatus. Without more limitations, elements defined by the sentence "including one" does not exclude that there are still other same elements in the process, method, object, or apparatus which includes the element. In addition, it should be noted that the scope of the methods and apparatuses in the implementations of this application is not limited to performing functions in an order shown or discussed, but may further include performing functions in a basically simultaneous manner or a converse order according to the involved functions. For example, the described methods may be performed in an order different from the described order, and various steps may be added, omitted, or combined. In addition, features described with reference to some examples may be combined in other examples.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such an understanding, the technical solutions of this application essentially or the part contributing to the prior art may be embodied in a form of a software product. The computer software product is stored in a storage medium (such as a ROM/RAM, a magnetic disk, or an optical disc) and includes several instructions to enable a terminal (which may be a mobile phone, a computer, a server, a network side device, or the like) to perform the methods described in the embodiments of this application.

The embodiments of this application are described above with reference to the accompanying drawings. However, this application is not limited to the foregoing specific implementations. The foregoing specific implementations are only exemplary and not limitative. Enlightened by this application, a person of ordinary skill in the art may further make many variations without departing from the idea of this application and the protection scope of the claims. All of the variations fall within the protection scope of this application.

What is claimed is:

1. An information determining method, wherein the method comprises:

determining, by a terminal according to a cell for receiving sidelink (SL) downlink control information (DCI), target information related to a target SL resource; wherein the target information indicates: a first timing advance group (TAG) or first timing information; wherein the first timing information is determined based on the first TAG; and determining, by the terminal, a resource location of the target SL resource according to the target information; wherein the target SL resource comprises at least one of the following:

a SL transmission resource indicated or configured or scheduled or activated or deactivated by the SL DCI; or a physical sidelink feedback channel (PSFCH) resource corresponding to the SL DCI;

wherein the SL transmission resource is located on a preset resource that is not earlier than a first location, and the first location is determined based on the target information.

2. The method according to claim 1, wherein the first timing information is any one of the following: timing information corresponding to a cell or a carrier in which the target SL resource scheduled or activated or deactivated by the SL DCI is located, timing information corresponding to a cell or a carrier in which the target SL resource configured by an SL configured grant (CG) configuration is located, and timing information corresponding to a cell or a carrier in which the target SL resource configured by an SL semi persistent scheduling SPS configuration is located; or, wherein the first TAG is any one of the following: a TAG corresponding to a cell or a carrier in which the target SL resource scheduled or activated or deactivated by the SL DCI is located, a TAG corresponding to a cell or a carrier in which the target SL resource configured by an SL configured grant CG configuration is located, and a TAG corresponding to a cell or a carrier in which the target SL resource configured by an SL semi persistent scheduling SPS configuration is located.

3. The method according to claim 1, wherein the resource location of the target SL resource is determined according to a first location obtained after a target offset is performed based on the target location;

wherein the target location is determined according to the SL DCI, and the target offset is determined according to the target information.

4. The method according to claim 1, wherein in a case that the target SL resource comprises the PSFCH resource, and the PSFCH resource is located at a first location determined in a case that downlink reference timing and SL timing are aligned.

5. The method according to claim 1, wherein in a case that the terminal is corresponding to a plurality of first reference objects, at least one of the following is met:

one first reference object comprises an uplink resource used to transmit SL feedback information;

one first reference object is used to transmit first control signaling; or at least two first reference objects are used to transmit first control signaling;

wherein the first reference object is a cell or a carrier; wherein the cell for receiving the SL DCI is one of the first reference object; and the first control signaling comprises at least one of the following: an SL SPS configuration, an SL CG configuration, or SL DCI;

wherein the first reference object used to transmit the first control signaling is the first reference object corresponding to the synchronization reference of the terminal.

6. The method according to claim 1, wherein the method further comprises:

obtaining, by the terminal, a target timing advance command;

wherein precision of the target timing advance command is related to any one of the following: an SL carrier spacing SCS, a UL SCS, and a first SCS in the SL SCS.

7. The method according to claim 6, wherein the UL SCS and the SL SCS correspond to a same TAG; or, wherein the target timing advance command comprises at least one of the following: a timing advance command corresponding to the target SL resource, or a timing advance command corresponding to the first TAG.

8. The method according to claim 6, wherein the precision of the target timing advance command meets any one of the following:

in a case that the target SL resource is located at a preset frequency domain location, the precision of the target timing advance command is related to the SL SCS; and if there are a plurality of SL SCSs, the precision of the target timing advance command is related to an SL SCS that meets a second condition in the plurality of SL SCSs.

9. The method according to claim 1, wherein the SL transmission resource is in a $1^{st}$ SL slot of the resource pool that starts not earlier than $$T_{DL} - \frac{T_{TA}}{2} + K_{SL} \times T_{slot};$$

wherein $K_{SL}$ is an interval between the SL DCI and a $1^{st}$ SL transmission scheduled by the SL DCI, $T_{DL}$ is a start point of a downlink slot carrying the SL DCI, $T_{TA}$ is a timing advance value being determined corresponding to the first TAG or the first timing information, and $T_{slot}$ is SL slot duration.

10. A terminal, comprising a processor, a memory, and a program or instructions that are stored in the memory and that may run on the processor, wherein the program or instructions are executed by the processor to implement the steps of an information determining method, comprising:

determining, according to a cell for receiving sidelink (SL) downlink control information (DCI), target information related to a target SL resource; wherein the target information indicates: a first timing advance group (TAG) or first timing information; wherein the first timing information is determined based on the first TAG; and determining a resource location of the target SL resource according to the target information;

wherein the target SL resource comprises at least one of the following:

a SL transmission resource indicated or configured or scheduled or activated or deactivated by the SL DCI; or a physical sidelink feedback channel (PSFCH) resource corresponding to the SL DCI;

wherein the SL transmission resource is located on a preset resource that is not earlier than a first location, and the first location is determined based on the target information.

11. The terminal according to claim 10, wherein the SL transmission resource is in a $1^{st}$ SL slot of the resource pool that starts not earlier than $$T_{DL} - \frac{T_{TA}}{2} + K_{SL} \times T_{slot};$$

wherein $K_{SL}$ is an interval between the SL DCI and a $1^{st}$ SL transmission scheduled by the SL DCI, $T_{DL}$ is a start point of a downlink slot carrying the SL DCI, $T_{TA}$ is a timing advance value being determined corresponding to the first TAG or the first timing information, and $T_{slot}$ is SL slot duration.

12. The terminal according to claim 11, wherein the first timing information is any one of the following: timing information corresponding to a cell or a carrier in which the target SL resource scheduled or activated or deactivated by the SL DCI is located, timing information corresponding to a cell or a carrier in which the target SL resource configured by an SL configured grant (CG) configuration is located, and timing information corresponding to a cell or a carrier in which the target SL resource configured by an SL semi persistent scheduling SPS configuration is located; or, wherein the first TAG is any one of the following: a TAG corresponding to a cell or a carrier in which the target SL resource scheduled or activated or deactivated by the SL DCI is located, a TAG corresponding to a cell or a carrier in which the target SL resource configured by an SL configured grant CG configuration is located, and a TAG corresponding to a cell or a carrier in which the target SL resource configured by an SL semi persistent scheduling SPS configuration is located.

13. The terminal according to claim 10, wherein the resource location of the target SL resource is determined according to a first location obtained after a target offset is performed based on the target location;

wherein the target location is determined according to the SL DCI, and the target offset is determined according to the target information.

14. The terminal according to claim 10, wherein in a case that the target SL resource comprises the PSFCH resource, and the PSFCH resource is located at a first location determined in a case that downlink reference timing and SL timing are aligned.

15. The terminal according to claim 10, wherein in a case that the terminal is corresponding to a plurality of first reference objects, at least one of the following is met:

one first reference object comprises an uplink resource used to transmit SL feedback information;

one first reference object is used to transmit first control signaling; or at least two first reference objects are used to transmit first control signaling;

wherein the first reference object is a cell or a carrier;

wherein the cell for receiving the SL DCI is one of the first reference object; and the first control signaling comprises at least one of the following: an SL SPS configuration, an SL CG configuration, or SL DCI;

wherein the first reference object used to transmit the first control signaling is the first reference object corresponding to the synchronization reference of the terminal.

16. The terminal according to claim 10, wherein the steps of the information determining method further comprises:

obtaining, by the terminal, a target timing advance command;

wherein precision of the target timing advance command is related to any one of the following: an SL carrier spacing SCS, a UL SCS, and a first SCS in the SL SCS.

17. A non-transitory readable storage medium, wherein a program or instructions are stored on the non-transitory readable storage medium, and the program or instructions are executed by a processor to implement:

determining, by a terminal according to a cell for receiving sidelink (SL) downlink control information (DCI), target information related to a target SL resource; wherein the target information indicates: a first timing advance group (TAG) or first timing information; wherein the first timing information is determined based on the first TAG; and determining, by the terminal, a resource location of the target SL resource according to the target information;

wherein the target SL resource comprises at least one of the following:

a SL transmission resource indicated or configured or scheduled or activated or deactivated by the SL DCI; or a physical sidelink feedback channel (PSFCH) resource corresponding to the SL DCI;

wherein the SL transmission resource is located on a preset resource that is not earlier than a first location, and the first location is determined based on the target information.

18. The non-transitory readable storage medium according to claim 17, wherein the SL transmission resource is in a $1^{st}$ SL slot of the resource pool that starts not earlier than $$T_{DL} - \frac{T_{TA}}{2} + K_{SL} \times T_{slot};$$

wherein $K_{SL}$ is an interval between the SL DCI and a $1^{st}$ SL transmission scheduled by the SL DCI, $T_{DL}$ is a start point of a downlink slot carrying the SL DCI, $T_{TA}$ is a timing advance value being determined corresponding to the first TAG or the first timing information, and $T_{slot}$ is SL slot duration.

19. The non-transitory readable storage medium according to claim 17, wherein in a case that the target SL resource comprises the PSFCH resource, and the PSFCH resource is located at a first location determined in a case that downlink reference timing and SL timing are aligned.

20. The non-transitory readable storage medium according to claim 17, wherein in a case that the terminal is corresponding to a plurality of first reference objects, at least one of the following is met:

one first reference object comprises an uplink resource used to transmit SL feedback information;

one first reference object is used to transmit first control signaling; or at least two first reference objects are used to transmit first control signaling;

wherein the first reference object is a cell or a carrier; wherein the cell for receiving the SL DCI is one of the first reference object; and the first control signaling comprises at least one of the following: an SL SPS configuration, an SL CG configuration, or SL DCI;

wherein the first reference object used to transmit the first control signaling is the first reference object corresponding to the synchronization reference of the terminal.

* * * * *